(12) United States Patent
Fredenburg et al.

(10) Patent No.: US 12,063,883 B2
(45) Date of Patent: *Aug. 20, 2024

(54) GROUNDS MAINTENANCE VEHICLE WITH ADJUSTABLE IMPLEMENT ANGLE

(71) Applicant: EXMARK MANUFACTURING COMPANY, INCORPORATED, Beatrice, NE (US)

(72) Inventors: Michael Shane Fredenburg, Hickman, NE (US); Justin Leigh Pryor, Beatrice, NE (US); Frederick Aubrey Fugett, Hallam, NE (US); Kenneth Lloyd McConnell, Stevensville, MI (US)

(73) Assignee: EXMARK MANUFACTURING COMPANY INCORPORATED, Beatrice, NE (US)

( * ) Notice: Subject to any disclaimer, the term of this patent is extended or adjusted under 35 U.S.C. 154(b) by 549 days.

This patent is subject to a terminal disclaimer.

(21) Appl. No.: 17/230,764

(22) Filed: Apr. 14, 2021

(65) Prior Publication Data

US 2021/0227745 A1    Jul. 29, 2021

Related U.S. Application Data

(63) Continuation-in-part of application No. 16/653,063, filed on Oct. 15, 2019, now Pat. No. 11,533,842.

(51) Int. Cl.
*A01D 34/74* (2006.01)
*A01D 34/82* (2006.01)
*A01D 101/00* (2006.01)

(52) U.S. Cl.
CPC ............. *A01D 34/74* (2013.01); *A01D 34/82* (2013.01); *A01D 2101/00* (2013.01)

(58) Field of Classification Search
CPC ..... A01D 34/74; A01D 34/82; A01D 2101/00
(Continued)

(56) References Cited

U.S. PATENT DOCUMENTS

| 4,869,057 | A | 9/1989 | Siegrist |
| 4,942,726 | A | 7/1990 | Bowditch |

(Continued)

FOREIGN PATENT DOCUMENTS

| CN | 203968680 | 3/2014 |
| GB | 2553182 | 2/2018 |
| WO | 2014119885 | 8/2014 |

OTHER PUBLICATIONS

U.S. Appl. No. 16/653,063, filed Oct. 15, 2019.

*Primary Examiner* — Mahmoud Gimie
(74) *Attorney, Agent, or Firm* — Mueting Raasch Group

(57) ABSTRACT

A grounds maintenance vehicle having a vehicle frame is disclosed. An implement is coupled to the vehicle frame and has a first implement end and a second implement end. A height selection tool is configured to select one vertical position of a plurality of selectable vertical positions, where each vertical position limits a distance between the implement and the vehicle frame. An implement angle selection tool has a manually engageable mechanism configured to change the elevation of one of the first implement end or the second implement end relative to the other of the first implement end or the second implement end. The implement angle selection tool is configured to fix the elevation of the first implement end relative the second implement end.

23 Claims, 11 Drawing Sheets

(58) Field of Classification Search
USPC .......................................................... 56/17.1
See application file for complete search history.

(56) References Cited

U.S. PATENT DOCUMENTS

| | | | |
|---|---|---|---|
| 6,085,508 | A | 7/2000 | Miatt et al. |
| 6,195,969 | B1 | 3/2001 | Yilmaz |
| 6,347,503 | B1 | 2/2002 | Esau |
| 7,028,456 | B2 | 4/2006 | Thatcher |
| 7,861,502 | B1 | 1/2011 | Benway |
| 7,930,813 | B2 | 4/2011 | Melone et al. |
| 9,301,444 | B2 | 4/2016 | Campbell et al. |
| 11,533,842 | B2 * | 12/2022 | Fredenburg ............ A01D 34/74 |
| 2005/0193699 | A1 | 9/2005 | Hatfield |
| 2007/0012016 | A1 | 1/2007 | Strope |
| 2014/0260161 | A1 * | 9/2014 | Lancaster ............... A01D 34/74 |
| | | | 56/17.1 |
| 2017/0099770 | A1 | 4/2017 | Badovinac |
| 2021/0105938 | A1 | 4/2021 | Fredenburg |

\* cited by examiner

GROUNDS MAINTENANCE VEHICLE WITH ADJUSTABLE IMPLEMENT ANGLE

This application is a continuation-in-part application of U.S. patent application Ser. No. 16/653,063, filed Oct. 15, 2019, which is hereby incorporated by reference in its entirety.

TECHNOLOGICAL FIELD

Embodiments of the present disclosure are generally related to maintenance vehicles. More particularly, embodiments of the present disclosure are related to maintenance vehicles with an adjustable implement angle.

BACKGROUND

Grounds maintenance vehicles such as lawn mowers, aerators, and spreader/sprayers are commonly used by homeowners and professionals alike. These vehicles are typically configured as walk-behind or ride-on vehicles having an attached implement (such as a grass cutting deck), where the implement is secured to a frame of the grounds maintenance vehicle. The height of the implement is generally adjustable relative to the vehicle frame and the ground. Some designs provide for manual adjustment of the height of the implement relative to the vehicle frame such as by a manually-adjustable position fastener associated with the implement that abuts the frame to set the desired height. The implement's weight exerts a force on the position fastener to, at least in part, secure the connection.

In addition to adjusting the height of the implement, it can also be desirable to adjust the angle of the implement relative to the ground. However, adjusting the implement angle can be a relatively cumbersome process. In some designs, it can take multiple people to adjust the implement angle at multiple attachment points. In some designs, adjusting the implement angle can require various tools and take a relatively significant amount of time. For some implements such as a grass cutting deck, it is important to adjust the angle of the cutting deck with the front leading edge of the blades either higher or lower than the back trailing edge of the blades. This adjustment is beneficial to optimize performance of the cutting deck and reduce power consumption.

SUMMARY

The technology disclosed herein can simplify the implement angle adjustment process. For example, in some embodiments the present technology relates to a grounds maintenance vehicle.

In some embodiments, the current technology is directed to a grounds maintenance vehicle having a vehicle frame. An implement is coupled to the vehicle frame and has a first implement end and a second implement end. A height selection tool is configured to select one vertical position of a plurality of selectable vertical positions, where each vertical position limits a distance between the implement and the vehicle frame. An implement angle selection tool is configured to change the elevation of one of the first implement end or the second implement end relative to the other of the first implement end or the second implement end and fix the elevation of the first implement end relative the second implement end. The implement angle selection tool has a manually engageable mechanism configured to allow changing of the elevation of one of the first implement end or the second implement end relative to the other of the first implement end or the second implement end when the implement angle selection tool is disengaged.

In some such embodiments, the implement hangs from the vehicle frame via chains. Additionally or alternatively, the implement has a plurality of cutting blades. Additionally or alternatively, the implement has a cutting deck having a housing defining a cutting chamber where the plurality of cutting blades are disposed in the cutting chamber. Additionally or alternatively, the height selection tool has a first plurality of pin openings defined by the vehicle frame and a first pin configured to be received by each of the pin openings.

Additionally or alternatively, the vehicle has a first shaft is pivotably coupled to the vehicle frame that is coupled to the implement at the first implement end, where the manually engageable mechanism has a foot pedal fixed to the first shaft. In some such embodiments, the vehicle has a second shaft pivotably coupled to the vehicle frame and coupled to the implement at the second implement end. Additionally or alternatively, the vehicle has a first link rigidly coupling the first shaft and the second shaft. Additionally or alternatively, the implement angle selection tool has a second plurality of pin openings defined by the first link and a second pin configured to be received by each of the pin openings. Additionally or alternatively, the first link has a length that is adjustable between the first shaft and the second shaft and the implement angle selection tool fixes the length.

Some embodiments are related to a grounds maintenance vehicle having a vehicle frame having a first side and a second side. A first shaft is pivotably coupled to the vehicle frame extending from the first side to the second side and a second shaft is pivotably coupled to the vehicle frame extending from the first side to the second side. An implement has a first implement end and a second implement end, where the first implement end is coupled to the first shaft and the second implement end is coupled to the second shaft. A manually engageable mechanism is configured to rotate the first shaft and the second shaft in unison. A height selection tool is configured to retain the first shaft and the second shaft in each of a plurality of discrete orientations against gravity to define a corresponding plurality of discrete limits on vertical distances between the implement and the vehicle frame. An implement angle selection tool is configured to pivot one of the first shaft or the second shaft relative to the other of the first shaft or the second shaft and fix the orientation of the first shaft relative to the second shaft.

In some such embodiments, the lever is fixed to the first shaft and the lever defines a stepping feature configured to be manually engaged by a foot of a user. Additionally or alternatively, the implement has a plurality of cutting blades. Additionally or alternatively, the implement has a cutting deck having a housing defining a cutting chamber and cutting blades disposed in the cutting chamber. Additionally or alternatively, the first shaft has a first shaft body and a first bell crank having a first extension extending radially outward from the first shaft body. Additionally or alternatively, the second shaft has a second shaft body and a second bell crank having a second extension extending radially outward from the second shaft body, and the grounds maintenance vehicle has a first link coupling the first extension and the second extension.

Additionally or alternatively, the height selection tool has a plurality of pin openings defined by the vehicle frame and a pin receiving surface defined by the first link. The height selection tool has a first pin configured to be received by a pin opening in the vehicle frame and the pin receiving surface of the first link, where the first pin is configured to obstruct pivoting of the first shaft and the second shaft. Additionally or alternatively, the height selection tool defines a plurality of pin openings defined by the vehicle frame and the height selection tool has a first pin configured to be received by each of the plurality of pin openings, where the first pin obstructs translation of the first link when the first pin is positioned in each of the plurality of pin openings.

Additionally or alternatively, the first link is configured to have a plurality of linear lengths between the first shaft and the second shaft, and the implement angle selection tool is configured to select each of the plurality of linear lengths of the first link. Additionally or alternatively, the first link has a first segment coupled to the first extension and a second segment coupled to the second extension, where the implement angle selection tool is configured to secure the first segment to the second segment to define each of the plurality of linear lengths of the first link.

Additionally or alternatively, the first link defines a linear translation pathway between the first segment and the second segment, and the implement angle selection tool selectively secures the first segment relative to the second segment at a plurality of locations along the linear translation pathway. Additionally or alternatively, the first bell crank has a first arm extending radially outward from the first shaft body in a different radial direction from the first extension and the second bell crank has a second arm extending radially outward and in a different radial direction from the second extension, and the implement hangs from the first arm and second arm.

Some embodiments relate to a grounds maintenance vehicle having a vehicle frame having a first side and a second side. A first shaft is pivotably coupled to the vehicle frame that extends from the first side to the second side. The first shaft has a first shaft body and a first bell crank towards the first side having a first extension extending radially outward from the first shaft body and a first arm extending radially outward from the first shaft body in a different radial direction from the first extension. The first shaft has a pivot crank towards the second side, the pivot crank extending radially outward from the first shaft body. A second shaft is pivotably coupled to the vehicle frame extending from the first side to the second side, the second shaft having a second shaft body and a second bell crank towards the first side. The second bell crank has a second extension extending radially outward from the second shaft body and a second arm extending radially outward from the second shaft body, where the second arm extends radially outward in a different radial direction from the second extension. The second shaft also has a third bell crank towards the second side having a third extension extending radially outward from the second shaft body and a third arm extending radially outward from the second shaft body in a different radial direction from the third extension.

A first link has a first segment coupled to the first extension and a second segment coupled to the second extension, where the first link has an adjustable length between the first shaft and the second shaft. An implement has a cutting deck having a housing defining a cutting chamber, cutting blades disposed in the cutting chamber, a first implement end, and a second implement end, where the first implement end is coupled to the first arm and the pivot crank and the second implement end is coupled to the second arm and the third arm.

A manually engageable mechanism is fixed to the first shaft. The manually engageable mechanism has a lever having a stepping feature configured to be manually engaged by a foot of a user, where the lever is configured to pivot the first shaft and the second shaft in unison. A height selection tool is configured to define a corresponding plurality of discrete limits on vertical distances between the implement and the vehicle frame, where the height selection tool has a plurality of pin openings defined by the vehicle frame and a first pin configured to be received by a pin opening of the plurality of pin openings. The first pin obstructs translation of the first link when the first pin is positioned in each of the first plurality of pin openings. An implement angle selection tool is configured to pivot the first shaft relative to the second shaft and fix the orientation of the first shaft relative to the second shaft by selectively securing the first segment to the second segment to define a user-selected linear length of the first link.

The above summary is not intended to describe each embodiment or every implementation. Rather, a more complete understanding of illustrative embodiments will become apparent and appreciated by reference to the following Detailed Description of Exemplary Embodiments and claims in view of the accompanying drawings.

BRIEF DESCRIPTION OF THE DRAWINGS

Exemplary embodiments will be further described with reference to the figures, wherein.

Figure 1:
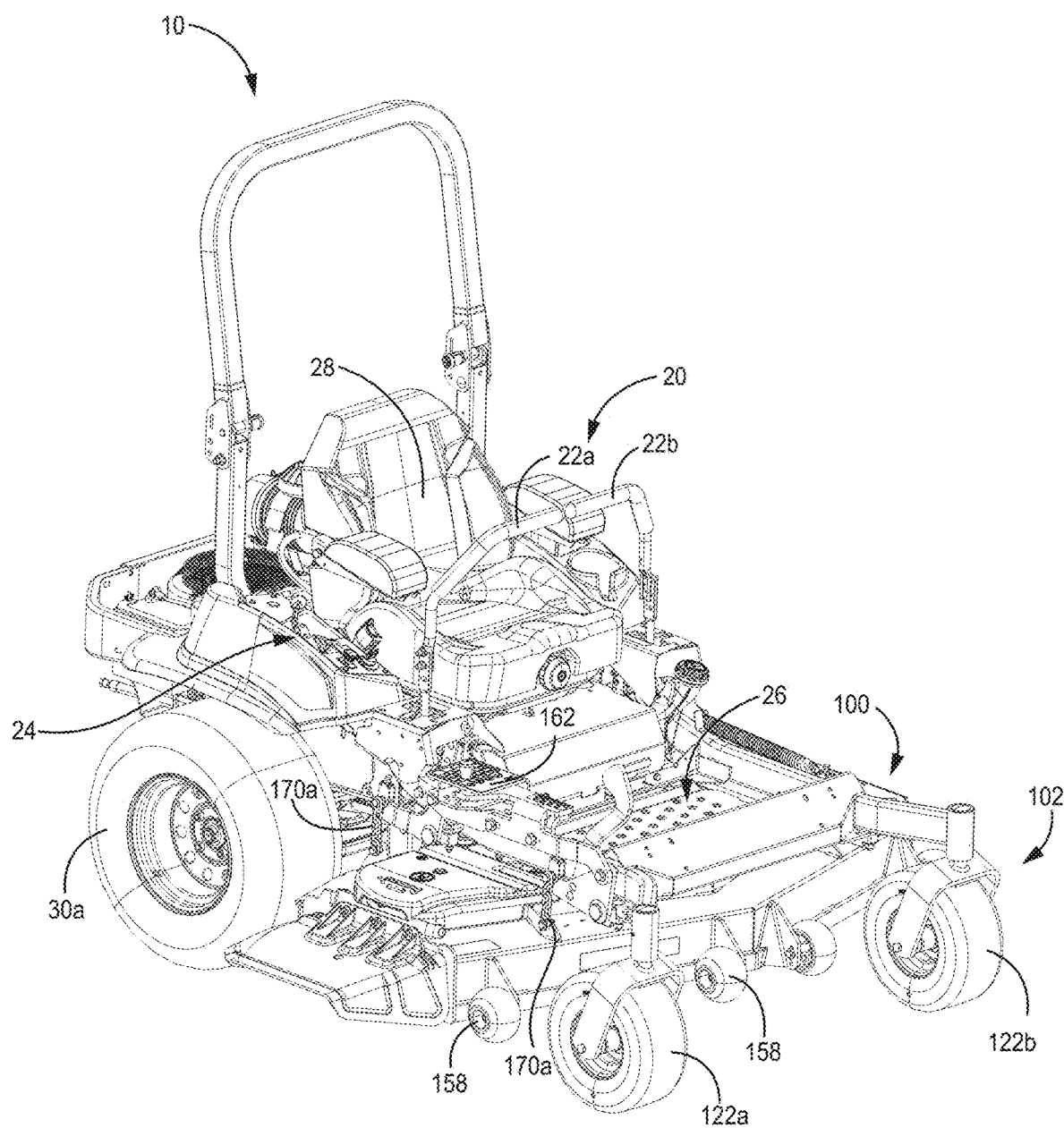
FIG. 1 depicts an example grounds maintenance vehicle in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the embodiments described herein. The lack of illustration/description of such structure/components in a particular figure is, however, not to be interpreted as limiting the scope of the various embodiments in any way.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings and subheadings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

It is also noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or from the perspective of one operating the vehicle while it is in an operating configuration. The numerical descriptors such as "first," "second," and "third" are used herein to distinguish components having similar names and should not be interpreted as limiting the location or function of the particular component referenced. Each term is used only to simplify the description, and is not meant to limit the interpretation of any embodiment described.

With reference to the figures, where like reference numerals designate like parts and assemblies throughout the several views, FIG. 1 illustrates an example grounds maintenance vehicle 10 in accordance with the present disclosure, which can simply be referred to as a "vehicle". The vehicle 10, in the current example, is a wide area riding lawn mower. While embodiments are described herein with respect to such a mower, this disclosure is equally applicable to mowers having alternate configurations (e.g., walk-behind mowers and stand-on mowers). The embodiments also apply to other types of grounds maintenance vehicles (e.g., aerators, dethatchers, debris management systems, blowers, vacuums, sweepers, general purpose utility vehicles, etc.) without limitation.

The vehicle 10 has a first portion that is an implement assembly 100 and a second portion that is a drive assembly 20. The drive assembly 20 of the grounds maintenance vehicle 10 can have drive wheels 30 and a prime mover (e.g., internal combustion engine or electric motor) that are configured to selectively propel the vehicle 10 across the ground surface 101. The drive assembly 20 can have handles 22 by which the vehicle 10 is directed and controlled by an operator. The drive assembly 20 can also have various other controls 24 that can be manipulated by the operator.

Figure 2:
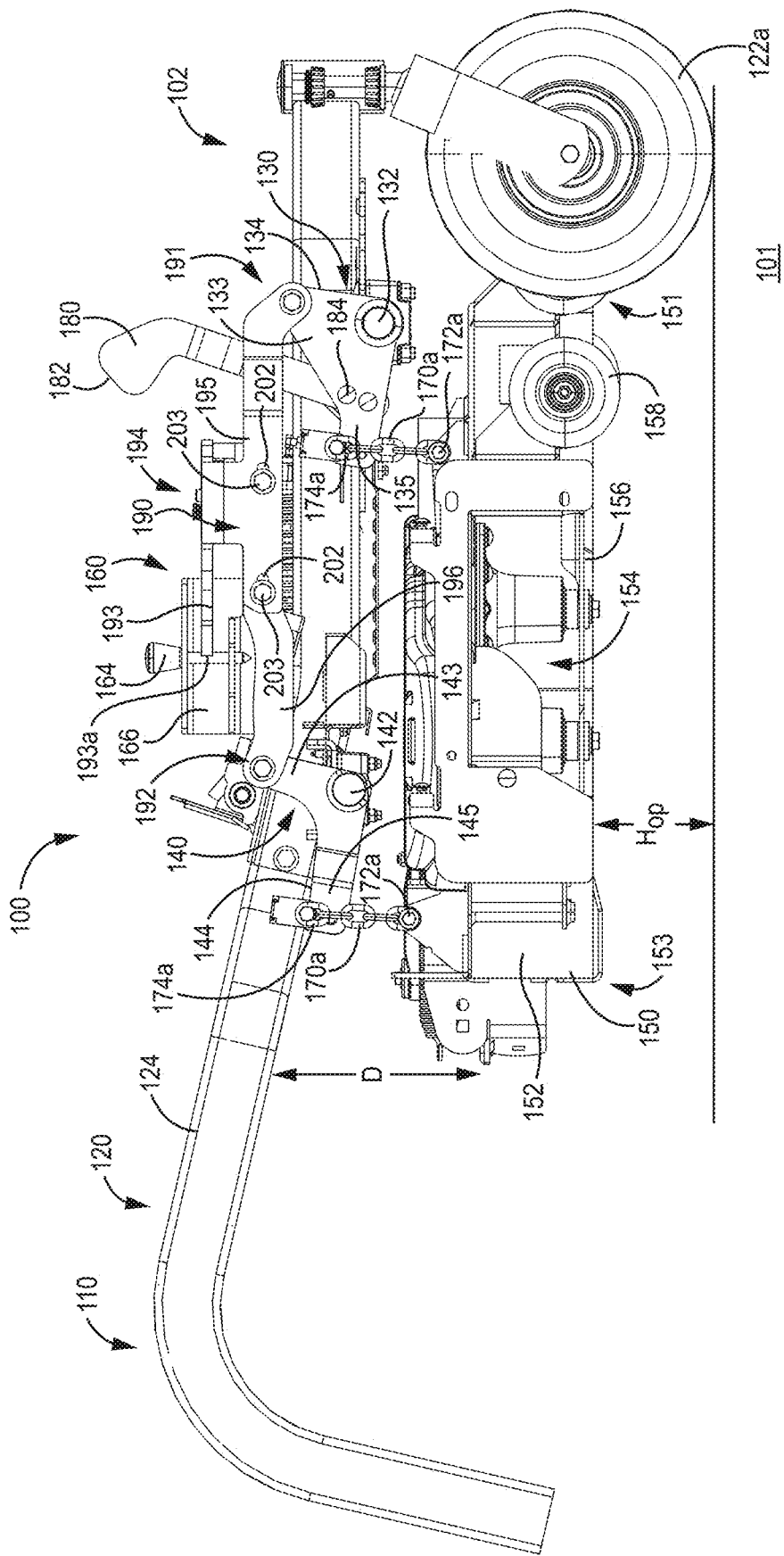
FIG. 2 depicts a first side view of an illustrative exemplary implement assembly in accordance with embodiments of the present disclosure.
Figure 3:
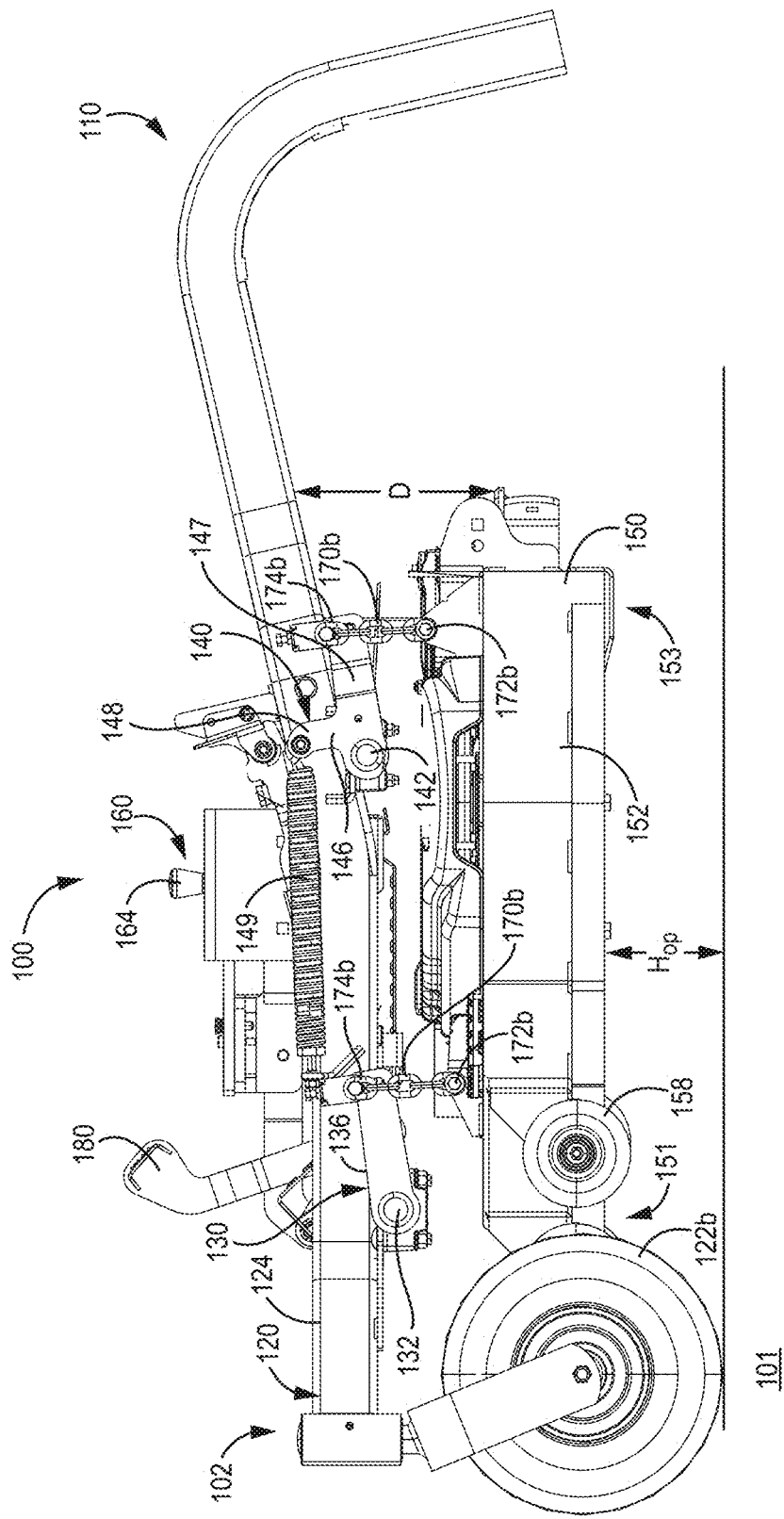
FIG. 3 depicts a second side view of an illustrative exemplary implement assembly in accordance with embodiments of the present disclosure.
Figure 4:
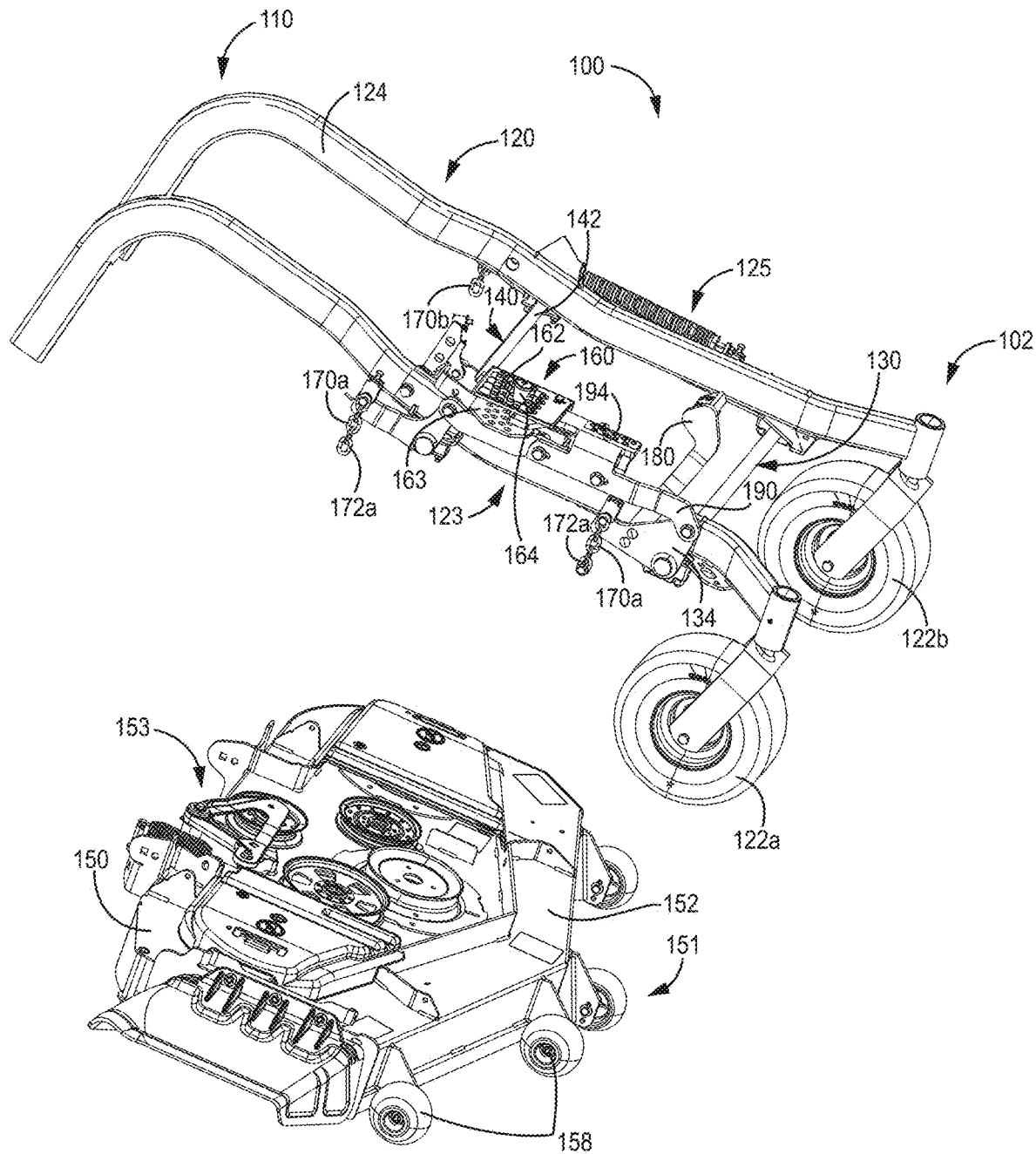
FIG. 4 depicts an implement assembly of FIG. 2, where an implement is exploded from a vehicle frame.

FIG. 2 depicts a first (e.g., right) side view of the example implement assembly 100 consistent with FIG. 1, FIG. 3 depicts a second (e.g. left) side view of the implement assembly 100, and FIG. 4 depicts the example implement assembly 100 where an implement 150 is exploded from a vehicle frame assembly 120. The currently-depicted implement assembly 100 is a mower deck assembly 100 that can be consistent with a walk-behind lawn mower or a ride-on lawn mower (as depicted in FIG. 1), as examples. In particular, the implement assembly 100 has an attachment end 110 that can be configured to attach to (or be integrally formed with) the second portion of a grounds-maintenance vehicle. The second portion of the grounds-maintenance vehicle can define components consistent with a ride-on lawn mower or a walk-behind lawn mower (such as that depicted in, and described with reference to, FIG. 1).

The suffixes "a" and "b" may be used with element numbers throughout this description to denote various left- and right-side parts/features, respectively. The parts/features denoted with "a" and "b" suffixes can be substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature and may correspond to a reference numeral on a drawing that is accompanied by a letter suffix.

As shown in FIGS. 1-4, the implement assembly 100 has a vehicle frame assembly 120 and an implement 150 coupled to the vehicle frame assembly 120, where the implement 150 is configured to perform a maintenance task on a surface, such as the ground surface 101. In the current example, the implement 150 is a cutting deck having a housing 152 defining a cutting chamber 154 (see FIG. 2). Cutting blades 156 (visible in FIG. 2) are rotatably disposed in the cutting chamber 154. Other types of cutting decks (e.g., out-front decks, towed decks, reel units, etc.), as well as other implements, are contemplated within the scope of this disclosure. During operation, power is selectively delivered to the cutting blades 156 by the engine, whereby the blades rotate at a speed sufficient to sever grass and other vegetation over which the deck passes.

The vehicle frame assembly 120 has a vehicle frame 124 having a first side 123 and a second side 125 (FIG. 4). The vehicle frame 124 is coupled to a first ground engaging member 122a and a second ground engaging member 122b that are disposed between the vehicle frame assembly 120 and the ground surface 101. The ground engaging members 122a, 122b are generally configured to accommodate translation of the vehicle frame assembly 120 across the ground surface 101. In the current example, the ground engaging members 122a, 122b are wheels that are rotatably coupled to the vehicle frame assembly 120. More particularly, the ground engaging members 122a, 122b are caster wheels that rotate (for rolling) and swivel (for turning) and are coupled to a front end 102 of the vehicle frame assembly 120. In some embodiments, the ground engaging members can be alternate structures or components other than caster wheels such as tracks, rollers, or drive wheels.

The implement 150 has a first implement end 151 and a second implement end 153 and is generally configured for operational interaction with the ground surface 101. In this example, the first implement end 151 is the front end of the implement 150 and the second implement end 153 is the back end of the implement 150. In the current example, the implement 150 is configured to be disposed between at least a portion of the vehicle frame assembly 120 and the ground surface 101. The implement 150 can have a plurality of rollers 158 (e.g., anti-scalp rollers) configured to be disposed between the implement 150 and a ground surface 101 to limit contact between the implement 150 and the ground surface 101. The plurality of rollers 158 can be configured to obstruct contact between the implement 150 and the ground surface 101 to reduce scalping of the ground surface 101 as the implement 150 translates across the ground surface 101.

As visible in FIGS. 2 and 3, the implement 150 is coupled to the vehicle frame assembly 120 through one or more coupling structures 170. The coupling structure 170 has a first end 172 fixed to the implement 150 and a second end 174 fixed to the vehicle frame assembly 120. In the current example, the coupling structures 170 are chains 170. The implement 150 hangs from the vehicle frame assembly 120 via the chains 170. The chains 170 define a pre-selected operating height $H_{op}$ between the implement 150 and the ground surface 101 for a specific height-of-cut setting. The chains 170 also define a limit on the vertical distance D between the implement 150 and the vehicle frame assembly 120 for a specific height-of-cut setting. In other embodiments, the coupling structures can be different components such as rods coupled with metal links, cables, plates with slots, or other non-rigid linkages that allows the implement to hang via gravity from the vehicle frame assembly 120.

The actual operating height of the implement 150 relative to the ground surface 101 can be less than the pre-selected operating height $H_{op}$ at locations where a portion of the ground surface 101 under the implement 150 has a height that exceeds the height of the portion of the ground surface 101 under the ground engaging members 122 of the vehicle frame assembly 120 (e.g. as is common with undulating turf). Similarly, the actual operating height of the implement 150 relative to the ground surface 101 can be greater than the pre-selected operating height $H_{op}$ at locations where a portion of the ground surface 101 under the implement 150 dips below the height of the portion of the ground surface 101 under the ground engaging members 122 and drive wheels 30 of the vehicle frame assembly 120. Also, it is noted that portions of the implement 150 may translate vertically upward towards the vehicle frame assembly 120 (which decreases the distance between the implement 150 and the vehicle frame assembly 120) to accommodate such an uneven ground surface 101 where an undulation pushes the implement upward. The non-rigid configuration of the coupling structures 170 accommodates such translation. The limit on the distance D between the implement 150 and the vehicle frame assembly 120 and the pre-selected operating height $H_{op}$ of the implement 150 relative to the ground surface 101 is determined when the implement assembly 100 is positioned on generally horizontal ground surface 101.

Particularly visible in FIG. 4, the vehicle frame assembly 120 has a first shaft 130 pivotably coupled to the vehicle frame 124 and a second shaft 140 also pivotably coupled to the vehicle frame 124. The first shaft 130 extends from the first side 123 of the vehicle frame 124 to the second side 125 of the vehicle frame 124 and the second shaft 140 extends from the first side 123 of the vehicle frame 124 to the second side 125 of the vehicle frame 124. The first shaft 130 is coupled to the implement 150 at the first implement end 151 and the second shaft 140 is coupled to the implement 150 at the second implement end 153.

More specifically, the first shaft 130 has a first shaft body 132 and a first bell crank 134 (FIG. 2) towards the first side 123 of the vehicle frame 124 and a pivot crank 136 (FIG. 3) towards the second side 125 of the vehicle frame 124. The first bell crank 134 (FIG. 2) has a first arm 135 extending radially outward from the first shaft body 132 and the pivot crank 136 (FIG. 3) extends radially outward from the first shaft body 132. The second shaft 140 has a second shaft body 142 and a second bell crank 144 (FIG. 2) towards the first side 123 of the vehicle frame 124 and a third bell crank 146 (FIG. 3) towards the second side 125 of the vehicle frame 124. The second bell crank 144 (FIG. 2) has a second arm 145 extending radially outward from the second shaft body 142 and the third bell crank 146 (FIG. 3) has a third arm 147 extending radially outward from the second shaft body 142.

The first (e.g., front) implement end 151 of the implement 150 is coupled to the first arm 135 (FIG. 2) and the pivot crank 136 (FIG. 3) via coupling structures 170. The second (e.g., back) implement end 153 of the implement 150 is coupled to the second arm 145 (FIG. 2) and the third arm 147 (FIG. 3) via coupling structures 170. The coupling structures 170 are pivotably coupled to the first arm 135, pivot crank 136, second arm 145, third arm 147, and the implement 150. When the vehicle 10 is static, the weight of the implement 150 under the force of gravity applies a rotational force on the first shaft 130 and the second shaft 140 via the first through third arms 135, 145, 147 of the respective bell cranks 134, 144, 146 and pivot crank 136. A height selection tool 160 is configured to oppose the rotational force exerted on the first shaft 130 and the second shaft 140 by the weight of the implement 150 to maintain the vertical position of the implement 150 relative to the ground surface 101 and the vehicle frame 124, which will be described in more detail below.

A first link 190 (FIG. 2) couples the first shaft 130 and the second shaft 140. The first link 190 is generally configured to translate rotational motion of the first shaft 130 to the second shaft 140 such that the first shaft 130 and the second shaft 140 rotate in unison. In particular, the first shaft 130 has a first extension 133 extending radially outward from the first shaft body 132. The first extension 133 and the first arm 135 extend in different radial directions from the first shaft body 132. The second shaft 140 has a second extension 143 extending radially outward from the second shaft body 142. The second extension 143 and the second arm 145 extend in different radial directions relative to the second shaft body 142. The first link 190 has a first end 191 that is pivotably coupled to the first extension 133 and a second end 192 that is pivotably coupled to the second extension 143. As such, if one of the first shaft 130 or second shaft 140 is rotated, that rotation is mechanically translated to the other of the second shaft 140 or first shaft 130, respectively.

As visible in FIG. 3, the third bell crank 146 has a third extension 148, where the third extension 148 and the third arm 147 extend in different radial directions relative to the second shaft body 142. A spring 149 couples the third extension 148 to the vehicle frame 124. In some embodiments the spring 149 can be omitted and the third extension 148 can be omitted. In such embodiments, such a component would no longer be described as a "third bell crank" because it would not be a bell crank and, rather, can be referred to as a "third arm".

Returning to FIGS. 2 and 4, a manually engageable mechanism 180 is fixed to the first shaft 130. The manually engageable mechanism 180 is generally configured to change the elevation of the implement 150. The manually engageable mechanism 180 is configured to pivot the first shaft 130 and/or the second shaft 140 in response to manual operation by a user. The manually engageable mechanism 180 has an engagement end 182 configured for manual engagement by a user and a coupling end 184 coupled to the first shaft 130 at the first bell crank 134. In some embodiments the manually engageable mechanism can be fixed to the second shaft. In some embodiments the manually engageable mechanism can be fixed to the first link 190. The manually engageable mechanism is currently shown as a lever, but in alternate embodiments the manually engageable mechanism can be a button, a touch screen, or that like, which can be in operative communication with an electric or hydraulic actuator.

In various embodiments including the one depicted, the engagement end 182 of the manually engageable mechanism 180 is a foot pedal that defines a stepping feature that is configured to be manually depressed by the foot of a user. In some alternate embodiments, the manually engageable mechanism 180 can be a hand lever that is configured to be manually adjusted by the hand of a user. In embodiments incorporating a stepping feature, such a stepping feature is configured to be accessible by the user during operation of the vehicle. In the example of FIG. 1, the engagement end 182 is positioned in a foot well 26 of the vehicle 10 that is configured to receive a user's feet when a user is seated in a seat 28 during operation of the vehicle 10. In another example consistent with a walk-behind mower, a manually engageable mechanism can be positioned towards the back end of the vehicle, adjacent to where the operator would be standing.

The manually engageable mechanism 180 is configured to pivot the first shaft 130 and the second shaft 140 in unison via the first link 190, but other configurations are certainly possible to achieve such functionality. In some alternate embodiments the first shaft and the second shaft can be in mechanical rotating communication via gears. In some embodiments the manually engageable mechanism 180 is fixed to the first link. Also, in some alternate embodiments the manually engageable mechanism is directly coupled to the second shaft.

To change the vertical position of the implement 150 in a system such as FIG. 2, a user can depress the engagement end 182 of the manually engageable mechanism 180, which rotates the first shaft 130 and second shaft 140 clockwise (or counter-clockwise with respect to FIG. 3), in unison. The clockwise rotation of the first shaft 130 and second shaft 140 pivots each of the second ends 174 of the coupling structures 170 in unison, which lifts the implement 150 to a particular vertical position. The height selection tool 160 can be engaged to define a plurality of discrete vertical distance limits between the implement 150 and the vehicle frame 124, which will now be described.

The height selection tool 160 generally defines a plurality of height settings 162 (visible in FIGS. 4 and 5) which are each selectable by a user. Each height setting of the plurality of height settings 162 can define a particular pre-selected operating height $H_{op}$ of the implement 150 relative to the ground surface 101. Each height setting can also define a particular vertical position of the implement 150 relative to the ground surface 101 (assuming a relatively planar ground surface 101) and the vehicle frame assembly 120, which is a limit on the distance D (visible in FIGS. 2 and 3) between the implement 150 and the vehicle frame 124. The plurality of height settings 162 can be discrete locations defined by the vehicle frame 124. In the current example, the height settings 162 are defined by a first plurality of pin openings 162 defined by the vehicle frame 124. The height selection tool 160 also has a first pin 164 that is configured to be received by each of the first plurality of pin openings 162. The first pin 164 is configured to obstruct the linear motion of the first link 190, which obstructs the vertical translation of the implement 150 towards the ground surface 101.

Each pin opening in the first plurality of pin openings 162 defines a discrete height setting, which defines a limit on the distance between the implement 150 and the vehicle frame 124 and/or ground surface 101. In various examples, the first pin 164 is configured to be manually removed from one pin opening of the first plurality of pin openings 162 and manually inserted into another pin opening of the first plurality of pin openings 162 to change the vertical position of the implement 150 relative to the vehicle frame 124 and/or the ground surface 101. In particular, the first pin 164 of the height selection tool 160 is inserted into a pin opening of the first plurality of pin openings 162 to define (1) the limit on the distance D (or the maximum distance) between the implement 150 relative to the vehicle frame 124 at that particular height setting and (2) the pre-selected operating height $H_{op}$ of the implement 150 relative to the ground surface 101.

In various implementations, when engaged at each discrete height setting, the height selection tool 160 prevents downward vertical translation of the implement 150 below the selected height setting. Accordingly, in the current example when the first pin 164 is positioned in each of the first plurality of pin openings 162 the first pin 164 obstructs translation of the implement 150 downward, below the particular pre-selected operating height $H_{op}$ defined by the height setting. There are various configurations that would allow this functionality.

In examples consistent with the current embodiment, the first pin 164 opposes the rotational force exerted on the first shaft 130 and the second shaft 140 by the weight of the implement 150, which retains the first shaft 130 and the second shaft 140 in a particular orientation against gravity. Indeed, the height selection tool 160 is configured to retain the first shaft 130 and the second shaft 140 in any one of a plurality of discrete orientations to define a corresponding plurality of discrete vertical distance limits between the implement and the vehicle frame 124. More particularly, the height selection tool 160 defines a pin pathway 166 (FIG. 2) that the first pin 164 is configured to extend through when received by one or more pin openings corresponding to a particular height setting. As best visible in FIGS. 4 and 5, the vehicle frame 124 defines a first plurality of pin openings 162 on one side of the pin pathway 166 and an aligned plurality of pin openings 163 on an opposite side of the pin pathway 166. The first link 190 defines a pathway extension 193 that is translatable through the pin pathway 166.

The first pin 164 is configured to obstruct translation of the pathway extension 193, and therefore the first link 190, beyond a point that would result in lowering the implement 150 below the selected height setting. In particular, the first link 190 has a pin receiving surface 193a that is configured to receive the first pin 164 when the first pin 164 is disposed in one pin opening of the plurality of pin openings 162. The first pin 164 is configured to obstruct translation of the pathway extension 193 to the left (relative to FIG. 2). That is to say, the first pin 164 obstructs pivoting of the first shaft 130 and the second shaft 140 in the direction that would result in lowering the implement below the selected height setting. Each pin opening corresponds to a particular orientation of the first shaft and the second shaft that results in a discrete implement height setting.

While the pin receiving surface 193a of the first link 190 forms a scalloped edge that is configured to accommodate the profile of the first pin 164 when positioned in each of the first plurality of pin openings 162, in some embodiments the pin receiving surface can be a straight edge. In some other embodiments the pin receiving surface can be defined by one or more holes in the pathway extension 193 of the first link 190 that are configured to align with the first plurality of pin openings 162 of the vehicle frame 124. Other configurations are certainly possible.

As described above, to set the height setting of the implement 150, a user depresses the engagement end 182 of the manually engageable mechanism 180 and engages the height selection tool 160 to select a vertical position of the implement 150. Depressing the engagement end 182 of the manually engageable mechanism 180 eliminates forces on the first pin 164 by the pin receiving surface 193a of the pathway extension 193 of the first link 190, which allows the user to engage the height selection tool 160 by removing and repositioning the first pin 164 in the first plurality of pin openings 162. The manually engageable mechanism 180 can then be released by the user to lower the implement 150 to the selected vertical position, at which point the pin receiving surface 193a of the pathway extension 193 makes contact with the first pin 164, which prevents the pathway extension 193 of the first link 190 from translating beyond the first pin 164. It is noted that the first pin 164, in the current example, does not prevent clockwise rotation of the first shaft 130 and second shaft 140 and/or translation of the implement 150 upward.

The height selection tool can have various alternate configurations. In some embodiments a height selection tool is a plurality of pin openings mutually defined by a vehicle frame and a first link. In such embodiments, the pin receiving surface of the first link can be considered the plurality of pin openings in the first link. Further, in such embodiments, a pin is configured to be received by a pin opening on the vehicle frame and an aligned pin opening on the first link. In such an embodiment the pin prevents translation of the first link relative to the vehicle frame, which prevents rotation of a first shaft and a second shaft and, therefore, prevents vertical translation of an implement in a downward direction. In this way, the maximum vertical distance between the implement and a ground surface and the implement and the vehicle frame is set. In some other embodiments, instead of having pin openings defining discrete height settings, the vehicle can have height settings that are continuous, such as by continuously sliding a vehicle frame relative to a first link and clamping the vehicle frame to the first link when an implement is at the desired operating height. Other configurations are also contemplated.

In various embodiments it can be desirable to also adjust the angle that the implement 150 is positioned in for operation. For example, adjusting the fore-and-aft tilt of the implement or "rake angle." In various embodiments the implement angle can impact the operation of the implement and/or the performance of the implement. In examples where the vehicle is a mower, for example, the implement angle can modify performance in response to such conditions as moisture content, grass type, grass thickness and grass height, as examples. In some examples, performance characteristics include the quality of mulch production and the appearance of cut grass. In other examples, performance can be modified with adjustment of the implement angle for various modes of cutting grass such as discharging, mulching, and collecting.

The vehicle 10 can incorporate an implement angle selection tool 194 that is configured to tilt the implement 150 by changing the elevation of the first implement end 151 relative the second implement end 153 and fixing the elevation of the first implement end 151 relative to the second implement end 153. In some embodiments where the implement is one or more cutting blades, the implement angle selection tool 194 tilts each of the cutting blades such that a front end of each cutting blade is at a different elevation relative to a back end. In various embodiments generally consistent with the current example, implement angle selection tool 194 is configured to pivot the first shaft 130 relative to the second shaft 140 and fix the orientation of the first shaft 130 relative to the second shaft 140.

In various examples, the first link 190 has an adjustable length between the first shaft 130 and the second shaft 140 and the implement angle selection tool 194 changes the length of the first link 190, which results in rotation of the first shaft 130 relative to the second shaft 140 as a result of the first extension 133 and second extension 143 pivoting closer together or farther apart (see FIG. 2). In embodiments, when the implement is level (e.g., forms a plane parallel with a horizontal plane), the first extension 133 and the second extension 143 are parallel and when the implement 150 is non-level, the first extension 133 and the second extension 143 are non-parallel.

In various embodiments, the implement angle selection tool 194 is configured to facilitate changing of the vehicle implement angle using only components of the vehicle itself. In other words, the implement angle selection tool 194 is configured to facilitate changing of the vehicle implement angle without the use of auxiliary tools that are separate from the vehicle 10. In various embodiments, the implement angle selection tool 194 is engaged and adjusted by a user at a single location rather than, for example, on two sides of the vehicle (such as the first side 123 and the second side 125 of the vehicle). In various embodiments, the implement angle selection tool 194 is configured to be engaged by a user from the user's operating position on the vehicle 10, such as the operator seat 28 in examples depicted herein.

Figure 5:
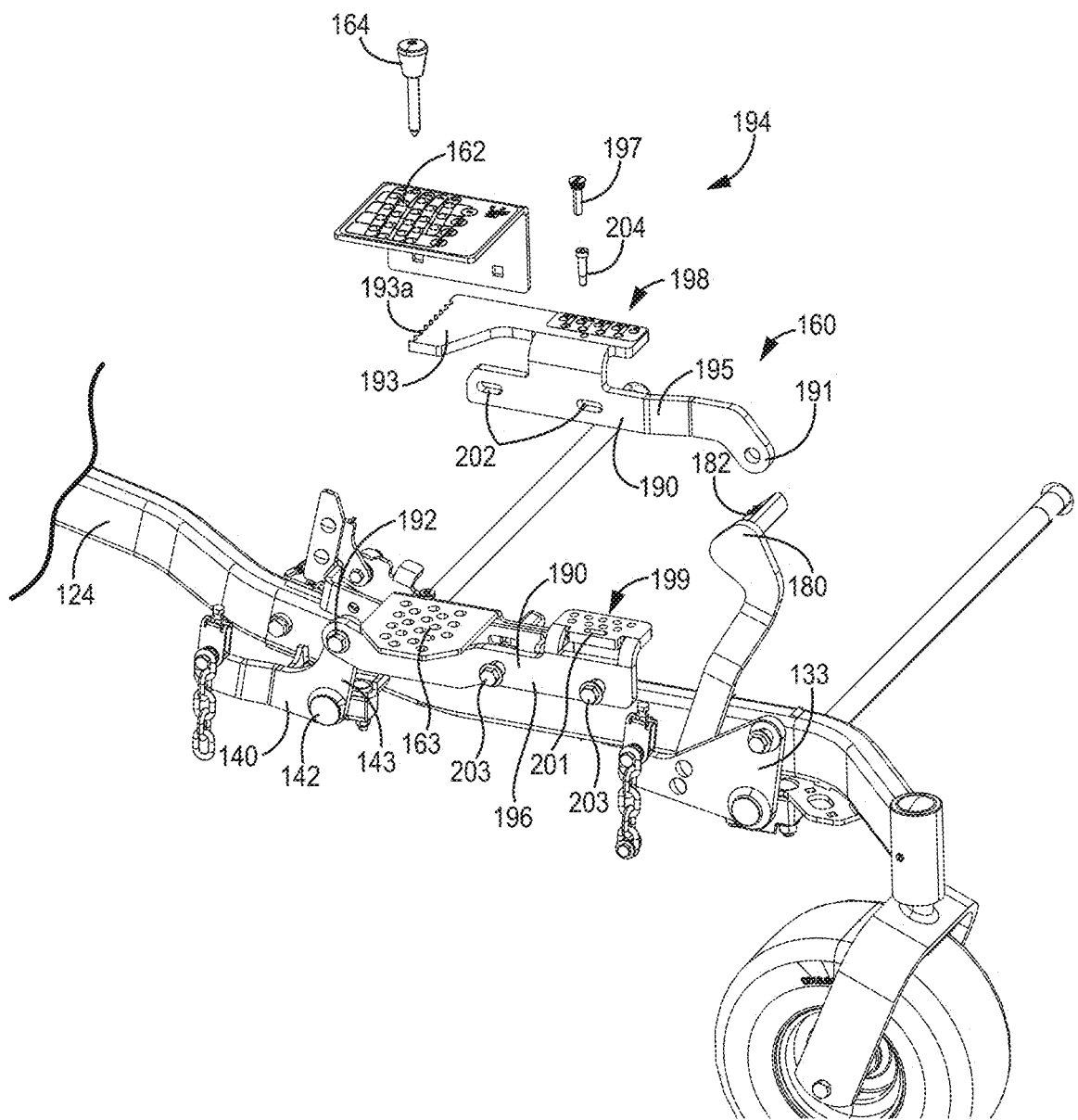
FIG. 5 depicts a partial exploded view of components of FIG. 2.

FIG. 5 depicts an exploded view of portions of the implement angle selection tool 194 and the height selection tool 160 consistent with FIGS. 1-4. The first link 190 has a first segment 195 and a second segment 196. The first segment 195 is pivotably coupled to the first shaft 130 via the first extension 133. The second segment 196 is pivotably coupled to the second shaft 140 via the second extension 143. The implement angle selection tool 194 is configured to selectively secure the first segment 195 relative to the second segment 196 to define a variable linear length of the first link 190.

The first segment 195 defines a second plurality of pin openings 198 and the second segment 196 defines a third plurality of pin openings 199. Each pin opening of the second plurality of pin openings 198 is configured to align with a corresponding opening of the third plurality of pin openings 199 to define a particular length of the first link 190 between the first shaft 130 and second shaft 140. As such, the first link 190 is configured to have a plurality of linear lengths between the first shaft 130 and the second shaft 140. The implement angle selection tool 194 is configured to select each of the plurality of linear lengths of the first link 190. In particular, the implement angle selection tool 194 has a second pin 197 that is configured to be mutually received by each pin opening of the second plurality of pin openings 198 and a corresponding opening of the third plurality of pin openings 199 to fix the implement angle. There can be additional or fewer pin openings 198, 199 than currently depicted to define the desired increments between settings and the desired range of settings.

The implement angle selection tool 194 can be disengaged by removing the second pin 197 from the pin openings in the first segment 195 and second segment 196. In various embodiments, the second pin 197 can be removed after reducing forces from the first segment 195 and second segment 196 on the second pin 197. The forces on the second pin 197 by the first segment 195 and the second segment 196 can be reduced by a shaft locking mechanism (not depicted) that is configured to lock the orientation of the second shaft 140. The shaft locking mechanism can be consistent with known mechanisms used to raise and secure the implement 150 relative to the vehicle frame 124 for transport.

Figure 10:
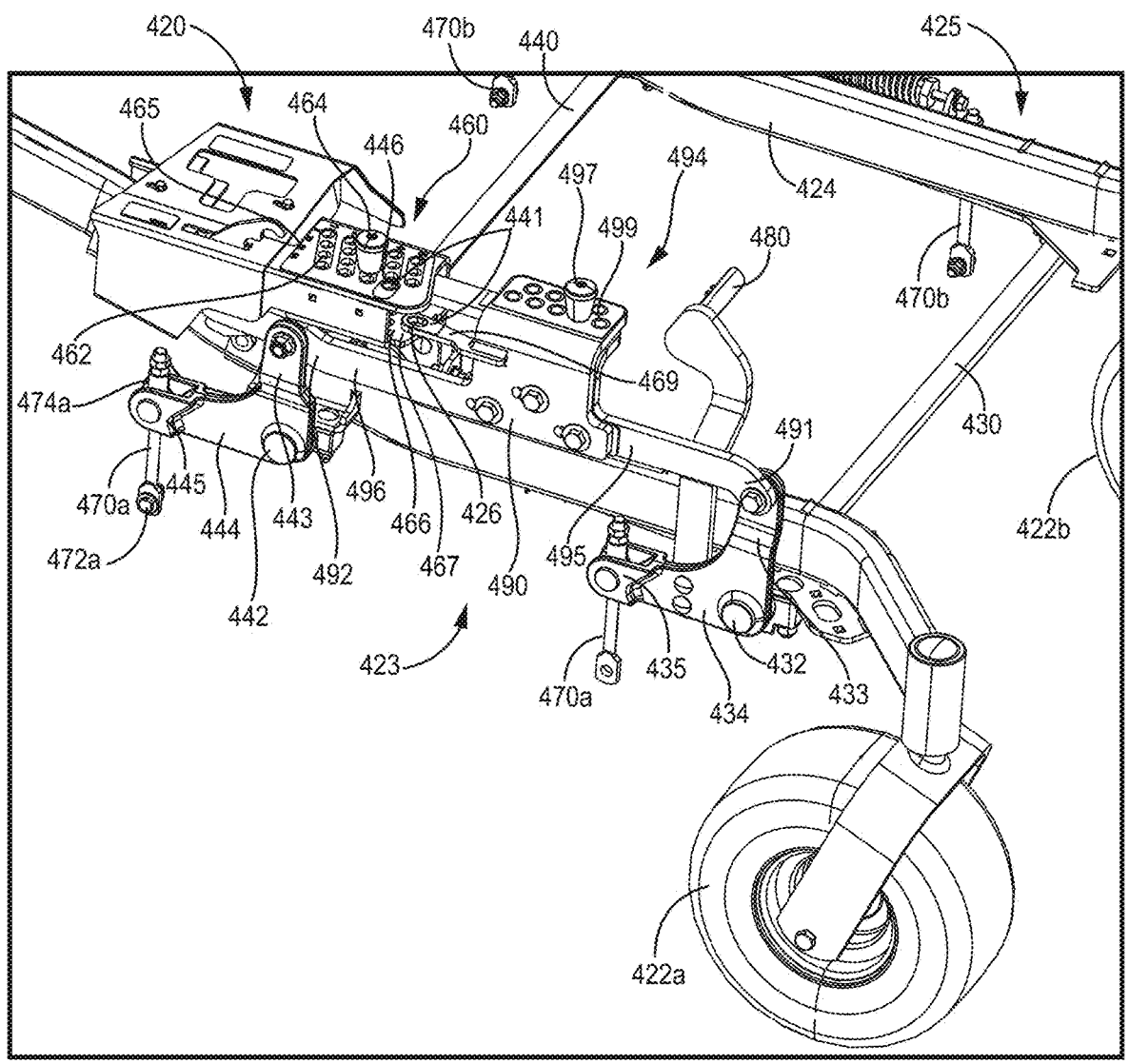
FIG. 10 is a partial perspective view of another example embodiment of a vehicle frame.
Figure 11:
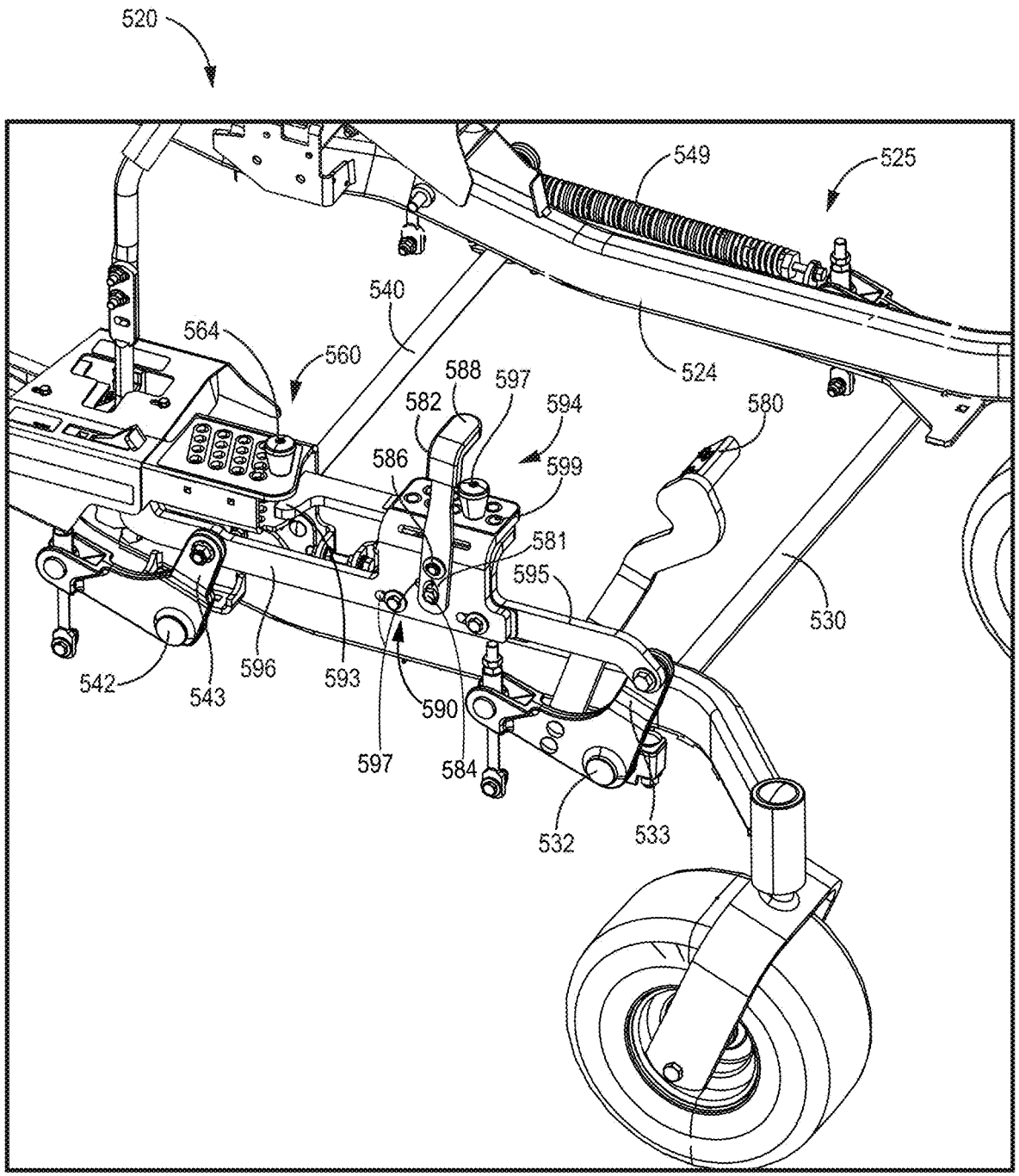
FIG. 11 is a partial perspective view of yet another example embodiment of a vehicle frame.

In some embodiments, to engage the shaft locking mechanism, the manually engageable mechanism 180 is depressed by a user until the shaft locking mechanism automatically engages the second shaft 140. In some other embodiments the manually engageable mechanism 180 is depressed by a user until a first engagement feature of the second shaft 140 aligns with a second engagement feature of the vehicle frame 124 and the user manually engages the shaft locking mechanism which couples the first engagement feature to the second engagement feature. For example, the first engagement feature and the second engagement feature can be pin openings that are configured to mutually receive a pin that is manually inserted by the user. Such an example is depicted in FIG. 10 and described below. In some embodiments, a shaft locking mechanism is not necessary. In such an example, the manually engageable mechanism 180 is depressed by a user enough to take the pressure off of the second pin 197 so that it can be removed and then moved to a new pin location for adjustment of the implement angle. FIG. 11, discussed below, depicts another example configuration where a specific shaft locking mechanism is omitted.

When the second pin 197 is removed, the first segment 195 and the second segment 196 are slidable relative to each other. The first link 190 defines a linear translation pathway between the first segment 195 and the second segment 196 such that the linear position of the first segment 195 relative to the second segment 196 is adjustable. In particular, the first segment 195 defines translation slots 202 that slidably receive first fasteners 203 of the second segment 196. Also, the second segment 196 defines a translation pathway 201 that slidably receives a second fastener 204 of the first segment 195. The translation slots 202 and the translation pathway 201 are generally configured to constrain the translation of the first segment 195 relative to the second segment 196 to a linear direction.

After the second pin 197 is removed, the manually engageable mechanism 180 can be manipulated by the user to align the pin opening of the second plurality of pin openings 198 corresponding to the desired implement angle on the first segment 195 with a corresponding pin opening of the third plurality of pin openings 199 on the second segment 196. When the shaft locking mechanism is engaged and the manually engageable mechanism 180 is fully released by a user, the weight of the implement 150 on the first arm 135 rotates the first shaft 130 counter-clockwise while the orientation of the second shaft 140 remains fixed, which shifts the first segment 195 closer to the second segment 196, thereby shortening the length of the first link 190. When the shaft locking mechanism is disengaged and the manually engageable mechanism 180 is depressed by a user, the first shaft 130 rotates clockwise while the orientation of the second shaft 140 remains fixed, which shifts the first segment 195 away from the second segment 196, thereby extending the length of the first link 190. For this reason, the manually engageable mechanism 180 can be considered a component of the implement angle selection tool 194.

The aligned the pin openings of the second plurality of pin openings 198 correspond to a plurality of linear lengths of the first link 190. The second pin 197 is configured to be inserted in each of the aligned pin openings to define each of the linear lengths of the first link 190. The second pin 197 selectively secures the first segment 195 relative to the second segment 196 at a plurality of locations along the linear translation pathway to defined the plurality of linear lengths of the first link 190, resulting in fixing a desired implement angle.

In some alternate embodiments, the shaft locking mechanism is configured to lock the orientation of the first shaft. In such embodiments, the manually engageable mechanism is pivotably coupled to the second shaft such that the second shaft can be pivoted relative to the first shaft. Other configurations are contemplated.

While, in the examples currently depicted, the implement angle selection tool can set the implement angle to a plurality of discrete settings, in various embodiments the implement angle can be selected along a continuous range. For example, if the first link has a first segment and second segment that are slidable relative to each other, the implement angle selection tool can be a clamp that selectively couples the first segment and second segment to define a length of the first link. In some such embodiments, the first segment and second segment are slidable relative to each other, such as through the use of a threaded link, cam, or a slot. Other approaches to adjust the length of the first link can be implemented. For example, rotating linkages or shims on telescoping rods can be used. Changing the length of the first link can be actuated through manual forces exerted on the system by a user, as presently described, but also through an actuator, such as an electric or hydraulic actuator.

Figure 6:
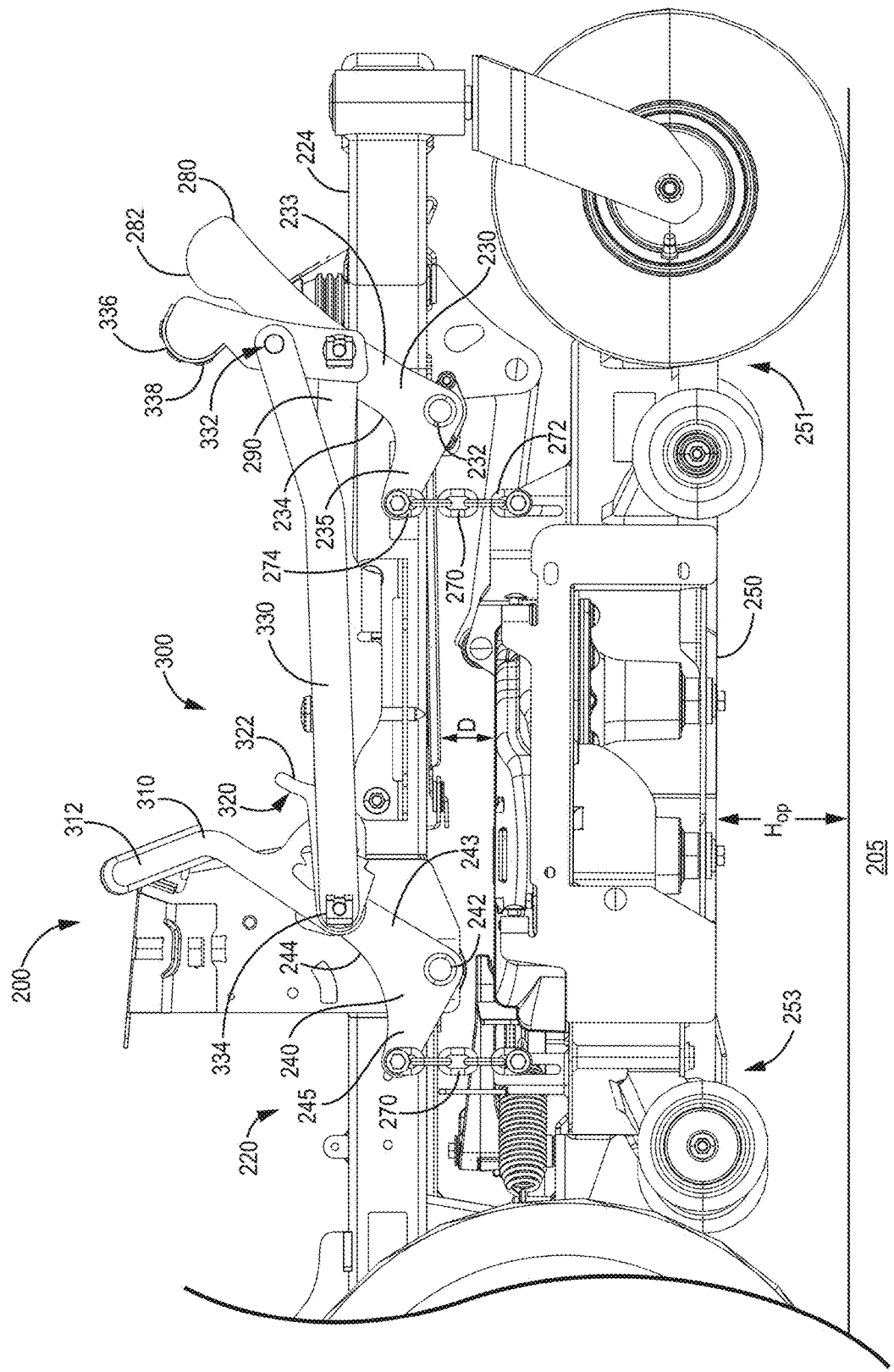
FIG. 6 depicts a perspective view of another embodiment consistent with the technology disclosed herein.

In some other embodiments where the length of a first link is adjustable, the first link can be a single unitary structure (rather than the first link 190 having a first segment 195 and second segment 196 in the examples discussed above). In some such embodiments, one end of the first link can define a linear translation pathway that is configured to slidably receive a first extension (similar to element 133, discussed above) or a second extension (similar to element 143, discussed above) of a first bell crank (similar to element 134, discussed above) or a second bell crank (similar to element 136, discussed above), respectively. An implement angle selection tool can selectively secure a first/second shaft at a plurality of locations along the linear translation pathway. FIG. 6 depicts a portion of an example vehicle 200 consistent with some such embodiments, where components have similar functionality, configurations, and modifications as similar components described above except where inconsistent with the current description.

The vehicle 200 has a vehicle frame assembly 220 having a vehicle frame 224 having a first side and second side as discussed and depicted above with respect to examples of the previous figures. An implement 250 is coupled to the vehicle frame 224. The implement 250 has a first implement end 251 and a second implement end 253. The implement 250 is configured to be disposed between at least a portion of the vehicle frame assembly 220 and the ground surface 205. The implement 250 is coupled to the vehicle frame assembly 220 through one or more coupling structures 270. Each coupling structure 270 has a first end 272 fixed to the implement 250 and a second end 274 fixed to the vehicle frame assembly 220. The implement 250 has a pre-selected operating height $H_{op}$ between the implement 250 and the ground surface 205. The implement 250 also has a limit on the vertical distance D between the implement 250 and the vehicle frame assembly 220.

The vehicle frame assembly 220 has a first shaft 230 pivotably coupled to the vehicle frame 224 and a second shaft 240 pivotably coupled to the vehicle frame 224. Each of the first shaft 230 and the second shaft 240 extends from the first side to the second side of the vehicle frame (not currently visible). The first shaft 230 is coupled to the implement 250 at the first implement end 251 and the second shaft 240 is coupled to the implement 250 at the second implement end 253. The first shaft 230 and second shaft 240 can incorporate bell cranks 234 and 244, similar to those previously discussed. As visible in FIG. 6, the first shaft 230 has a first shaft body 232 and a first arm 235 extending radially outward from the first shaft body. The second shaft 240 has a second shaft body 242 and a second arm 245 extending radially outward from the second shaft body 242. The implement 250 is coupled to the first arm 235 and the second arm 245 via coupling structures 270.

The vehicle 200 can incorporate an implement angle selection tool 300 that is configured to tilt the implement 250 to change the elevation of the first implement end 251 relative the second implement end 253 and fix the elevation of the first implement end 251 relative to the second implement end 253. That is, the implement angle selection tool 300 is configured to pivot the first shaft 230 relative to the second shaft 240 and fix the orientation of the first shaft 230 relative to the second shaft 240. In particular, a first link 290 rigidly couples the first shaft 230 and the second shaft 240. The first link 290 has an adjustable length between the first shaft 230 and the second shaft 240, which is visible in FIG. 7, where components of the implement angle selection tool 300 are removed for clarity.

The first link 290 has a first end 291 that is pivotably coupled to a first extension 233 of the first shaft 230 and a second end 292 that is pivotably coupled to a second extension 243 of the second shaft 240 (where the first extension 233 and second extension 243 can be consistent with descriptions of similar components discussed above). However, unlike the embodiments depicted above, here the second end 292 of the first link 290 defines a linear translation pathway 293 that slidably receives the second extension 243. As the first link 290 is translated relative to the second extension 243 along the linear translation pathway 293, the first shaft 230 rotates relative to the second shaft 240, which raises/lowers the first implement end 251 relative to the second implement end 253.

The implement angle selection tool 300 changes and fixes the length of the first link 290 between the first shaft 230 and the second shaft 240. FIG. 8 depicts the vehicle of FIG. 7 with a first component of the implement angle selection tool 300 that is a selection lever 310. The selection lever 310 is pivotably attached to the second extension 243 at a pivot 316, the latter being slidably received in the linear translation pathway 293. The selection lever 310 has a plurality of pin receptacles 314 that are each configured to receive a translation pin 294 on the first link 290. Each pin receptacle 314 effectively defines a different length of the first link 290 when the translation pin is received thereby. The selection lever 310 has a handle 312 that is configured to be manually pivoted by a user about the second extension 243 to choose the angle of the implement 250 by selecting the length of the first link 290 between the first shaft 230 and the second shaft 240.

Figure 8:
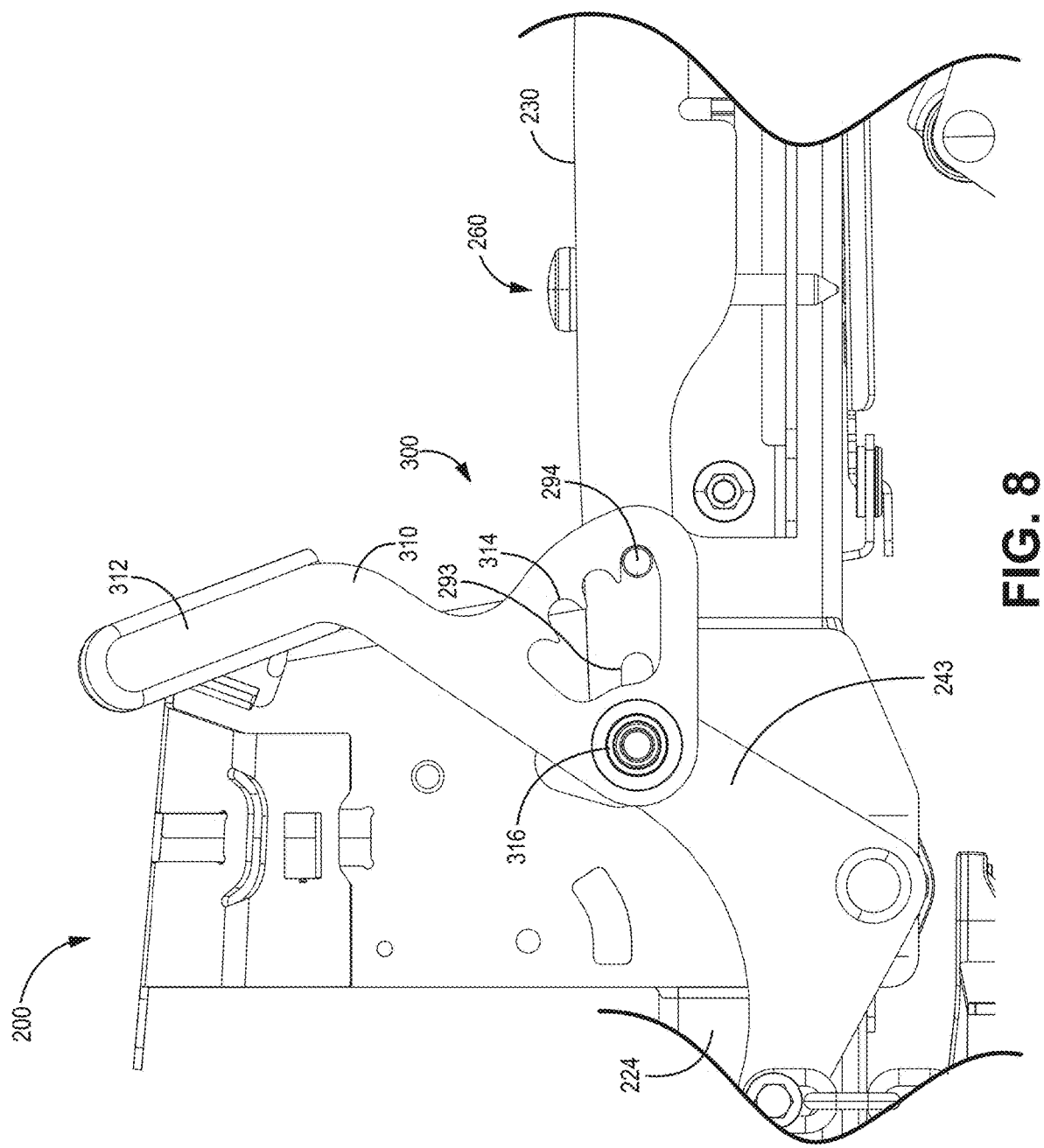
FIG. 8 is a side view of an example embodiment consistent with FIG. 7.
Figure 9:
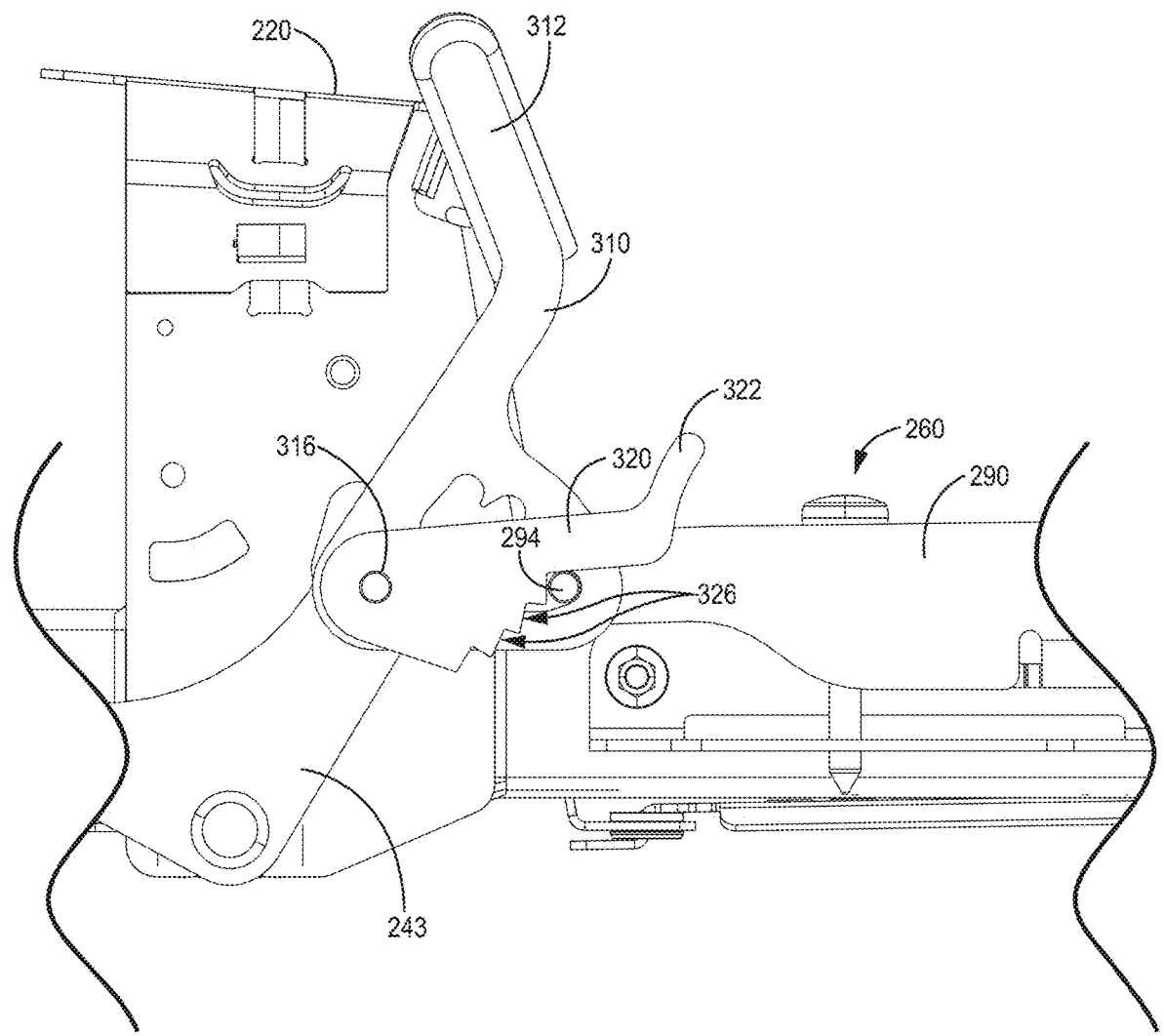
FIG. 9 is a side view of another example embodiment consistent with FIG. 8.

FIG. 9 depicts the portion of the vehicle of FIG. 8 with another example component of the implement angle selection tool 300 that is a locking lever 320. The locking lever 320 is pivotably connected to the second extension 243 and the selection lever 310 at the pivot 316 and is slidably received by the linear translation pathway 293 with the second extension 243 and selection lever 310. The locking lever 320 defines a plurality of locking surfaces 326 that are each configured to secure the translation pin 294 of the first link 290 in a corresponding pin receptacle 314. Each of the locking surfaces 326 of the locking lever 320 can be configured to frictionally engage the translation pin 294. The locking lever 320 has a handle 322 by which a user can pivot the locking lever 320 into position to lock the position of the translation pin 294 in the corresponding pin receptacle 314. Although this embodiment is shown with four pin receptacles 314, there can be more or less pin receptacles to provide alternate adjustment increments and/or options.

Returning to FIG. 6, which depicts the entire implement angle selection tool 300, a first manually engageable mechanism 336 (e.g., a selection pedal) is pivotably coupled to a first end 332 of a secondary link 330. A second end 334 of the secondary link 330 is coupled to the second extension 243. The selection pedal 336 is pivotably coupled to the first extension 233 at one end. The selection pedal 336 defines a first stepping feature 338 at a distal end. When the locking lever 320 is disengaged from the translation pin 294, the first stepping features 338 of the selection pedal 336 can be depressed by a user to decrease the length of the first link 290 between the first shaft 230 and second shaft 240, which rotates the second shaft 240 clockwise and raises the second implement end 253 clockwise relative to the first implement end 251.

Figure 7:
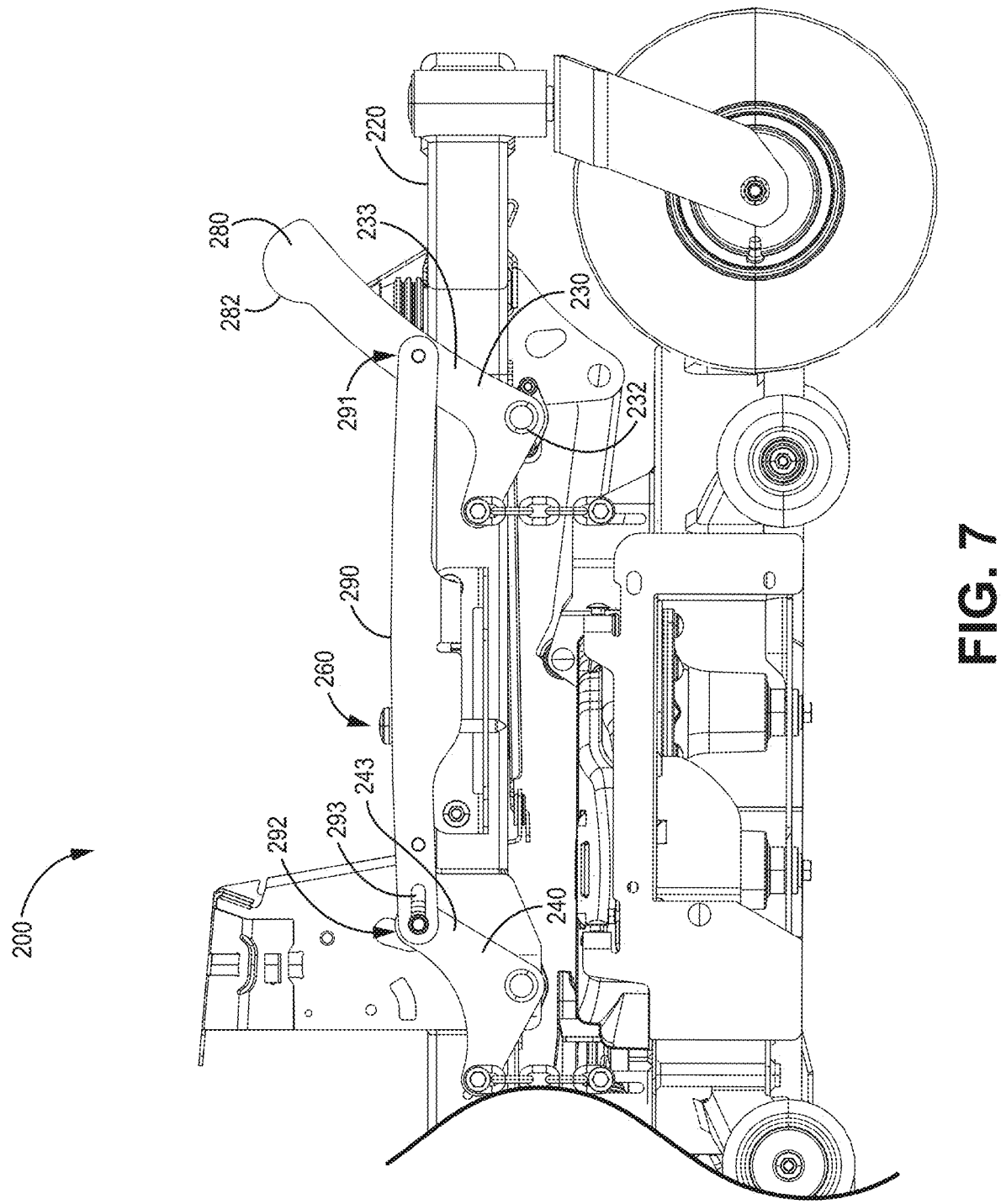
FIG. 7 is a side view of yet another embodiment consistent with the technology disclosed herein.

As best visible in FIGS. 7-9, a height selection tool 260 can be operatively disposed between the implement 250 and the vehicle frame assembly 220. As discussed above, with respect to previous figures, the height selection tool 260 is generally configured to select a vertical position of the implement 250 relative to the ground surface 205 and the vehicle frame 224, where each selectable vertical position limits a distance D between the implement 250 and the vehicle frame 224 (and, therefore, the pre-selected operating height $H_{op}$ of the implement 250 relative to a generally planar ground surface 205). The height selection tool 260 can be consistent with the discussions above.

In the current example, the vehicle 200 has a second manually engageable mechanism 280 (best visible in FIG. 7) configured to pivot the first shaft 230 and the second shaft 240 in unison. Here the second manually engageable mechanism 280 defines a second stepping feature 282 configured to be manually engaged by the foot of a user. The second manually engageable mechanism 280 is fixed to the first shaft 230 and coupled to the first end 291 of the first link 290 such that the first link 290 is pivotable relative to the first shaft. Unlike examples discussed above, here the second manually engageable mechanism 280 is integral with the first shaft 230. In particular, the second manually engageable mechanism 280 is a further extension of the first extension 233. Other configurations are certainly contemplated.

FIG. 10 is a perspective view of a portion of a vehicle frame assembly 420 consistent with various examples. The non-depicted components of the vehicle can be consistent with example vehicles discussed above including components such as an implement, a prime mover, wheels, as examples. Similarly, the vehicle frame assembly 420 is generally consistent with descriptions above except where inconsistent with the current description.

The vehicle frame assembly 420 has a vehicle frame 424 having a first side 423 and a second side 425. The vehicle frame 424 is coupled to a first ground engaging member 422a and a second ground engaging member 422b (partially visible) that are disposed between the vehicle frame assembly 420 and a ground surface that are caster wheels in this example. The vehicle frame 424 is also generally coupled to drive wheels (not currently depicted).

Similarly to examples discussed above, an implement is configured to be coupled to the vehicle frame assembly 420 through one or more coupling structures 470. The coupling structure 470 has a first end 472 configured to be fixed to the implement and a second end 474 fixed to the vehicle frame assembly 420. In the current example, the coupling structures are rigid linkages rather than the chains disclosed above, and the implement is configured to hang from the vehicle frame assembly 420 via the rigid linkages 470. The rigid linkages 470 define a pre-selected operating height between the implement and the ground surface 401 for a specific height-of-cut setting and a limit on the vertical distance between the implement and the vehicle frame assembly 420, as discussed above. In other embodiments that were discussed above, the coupling structures can be non-rigid linkages such as chains and the like.

The vehicle frame assembly 420 has a first shaft 430 pivotably coupled to the vehicle frame 424 and a second shaft 440 also pivotably coupled to the vehicle frame 424. The first shaft 430 extends from the first side 423 of the vehicle frame 424 to the second side 425 of the vehicle frame 424 and the second shaft 440 extends from the first side 423 of the vehicle frame 424 to the second side 425 of the vehicle frame 424. The first shaft 430 is configured to be coupled to a first implement end of an implement and the second shaft 440 is configured to be coupled to a second implement end of the implement. The first shaft 430 and second shaft 440 can incorporate bell cranks 434 and 444, similar to those previously discussed. The first shaft 430 has a first shaft body 432 and a first arm 435 extending radially outward from the first shaft body. The second shaft 440 has a second shaft body 442 and a second arm 445 extending radially outward from the second shaft body 442. The implement is configured to be coupled to the first arm 435 and the second arm 245 via coupling structures 470.

A height selection tool 460 is operatively disposed between the implement and the vehicle frame assembly 420. The height selection tool 460 is generally configured to select a vertical position of the implement relative to the ground surface and the vehicle frame 224, where each selectable vertical position limits a distance between the implement and the vehicle frame 224 (and, therefore, the pre-selected operating height $H_{op}$ of the implement 250 relative to a generally planar ground surface 205). The height selection tool 260 can be consistent with the discussions above.

A first link 490 couples the first shaft 430 and the second shaft 440. The first link 490 is generally configured to translate rotational motion of the first shaft 430 to the second shaft 440 such that the first shaft 430 and the second shaft 440 rotate in unison. In particular, the first shaft 430 has a first extension 433 extending radially outward from the first shaft body 432 and the second shaft 440 has a second extension 443 extending radially outward from the second shaft body 442. The first link 490 has a first end 491 that is pivotably coupled to the first extension 433 and a second end 492 that is pivotably coupled to the second extension 443.

The frame assembly 420 has a manually engageable mechanism 480 configured to pivot the first shaft 430 and the second shaft 440 in response to manual operation (such as depressing and/or releasing) by a user to change the elevation of an implement and can be configured as discussed above. The height selection tool 460 defines a plurality of height settings 462 which are each selectable by a user. In this particular example, the height settings 462 are pin openings that are configured to receive a first pin 464, which is configured to obstruct the linear motion of the first link 490, which obstructs the vertical translation of the implement towards the ground surface 401. The first link 490 defines a pathway extension (not visible in the current view) that is translatable through a pin pathway 466. The first pin 464 is configured to obstruct translation of the pathway extension along the pin pathway 466 and, therefore, the first link 490, beyond a point that would result in lowering the implement below the selected height setting. The height selection tool 460, and modifications thereof, can be consistent with the descriptions above, particularly (but not exclusively) with reference to FIGS. 1-5.

The frame assembly 420 of a vehicle can incorporate an implement angle selection tool 494 that is configured to tilt the implement by changing the elevation of the first implement end relative the second implement end and fixing the elevation of the first implement end relative to the second implement end. As discussed above with reference to FIGS. 1-5, the implement angle selection tool 494 changes the length of the first link 490, which results in rotation of the first shaft 430 relative to the second shaft 440 as a result of the first extension 433 and second extension 443 pivoting closer together or farther apart.

The functions of the implement angle selection tool 494 have been described in detail above. The structure of the implement angle selection tool 494 is similar to examples discussed above. Broadly, the implement angle selection tool 494 is configured to selectively secure a first segment 495 of the first link 490 relative to a second segment 496 of the first link 490 to define a variable linear length of the first link 490. More particularly, the first link 490 is configured to have a plurality of linear lengths between the first shaft 430 and the second shaft 440, and the implement angle selection tool 494 is configured to select each of the plurality of linear lengths of the first link 490. A second pin 497 is inserted in aligned pin openings 499 of the first segment 495 and the second segment 496 to fix the length of the first link 490 and, therefore, fix the relative orientations of the first shaft 430 and the second shaft 440.

In the example depicted, the frame assembly 420 has a shaft locking mechanism 441 that is configured to be engaged prior to adjusting the implement angle selection tool 494. The shaft locking mechanism 441 is generally configured to lock the orientation of one of the first shaft 430 and the second shaft 440 prior to adjusting the orientation of the other of the first shaft 430 and the second shaft 440 to adjust the implement angle. In some embodiments, when the shaft locking mechanism 441 is disengaged (such as depicted in FIG. 10), the manually engageable mechanism 480 is configured to rotate the first shaft 430 and the second shaft 440 in unison to adjust the height of the implement. Further, when the shaft locking mechanism 441 is engaged, which will be explained below, the manually engageable mechanism 480 is configured to adjust the orientation of one of the first shaft 430 or the second shaft 440 relative to the other of the first shaft 430 or the second shaft 440 to adjust the implement angle. In this particular example, the manually engageable mechanism 480 is configured to lock the orientation of the second shaft 440, and the orientation of the first shaft 430 relative to the second shaft 440 can be adjusted by the manually engageable mechanism 480.

The shaft locking mechanism 441 includes a first engagement feature 446 defined by the frame 424 and a second engagement feature 426 defined by the second segment 496. In the current example, the first engagement feature 446 and the second engagement feature 426 are pin openings. The pin opening that is the first engagement feature 446 is defined in a first panel 465 that has the first plurality of pin openings 462 that define the height settings of the implement. The first engagement feature 446 can also include an axially aligned pin opening in a second panel 467 that has the aligned plurality of pin openings (not clearly visible, but similar to those depicted in the discussion of FIGS. 1-5, above) on the opposite side of the pin pathway 466. The pin opening that is the second engagement feature 426 is defined by a lock extension 469 that is configured to be insertable into the pin pathway 466. The pin opening that is the second engagement feature 426 is configured to be selectively translated into axial alignment with the first engagement feature 446 for engagement of the shaft locking mechanism 441.

To engage the shaft locking mechanism 441 the manually engageable mechanism 480 is manipulated by a user (depressed or released) until the second pin opening 426 of the second shaft 440 substantially axially aligns with the first pin opening 446 of the vehicle frame 424. The first pin 464 is removed from the pin openings 462 of the height selection tool 460 before aligning the first pin opening 446 with the second pin opening 426 if it would otherwise obstruct aligning the first pin opening 446 with the second pin opening 426. Alternatively, the first pin 464 is removed from the pin openings 462 of the height selection tool 460 after aligning the first pin opening 446 with the second pin opening 426. The first pin 464 is then manually inserted by the user through the aligned pin openings 426, 446 to set the implement angle. In the current example, the first pin 464 is a component of the height selection tool 460.

As has been discussed elsewhere herein, in some embodiments the shaft locking mechanism 441 can be configured to lock the orientation of the first shaft 430, and the orientation of the second shaft 440 can be adjusted to change the angle of the implement. In such embodiments, the second engagement feature (such as a pin opening defined by a lock extension) can be defined by the first segment 495 of the first link 490 that is configured to be selectively fixed to the first engagement feature (such as a pin opening defined by the frame assembly 420) to lock the orientation of the first shaft 430.

FIG. 11 is a perspective view of a portion of yet another vehicle frame assembly 520 consistent with various examples. The vehicle frame assembly 520 has consistent components, structures, and functionality described above with reference to FIG. 10, except in this example, the implement angle selection tool 594 has an alternate configuration, which will now be described.

In the present example the implement angle selection tool 594 omits a shaft locking mechanism. Furthermore, in this example the implement angle selection tool 594 is configured to rotate the second shaft 540 relative to the first shaft 530. The implement angle selection tool 594 is configured to change the implement angle by changing the elevation of the second implement end relative the first implement end and fix the elevation of the second implement end relative to the first implement end. Similar to FIG. 10, the implement angle selection tool 594 changes the length of the first link 590. However, in this example, changing the length of the first link 590 results in pivoting the second extension 543 while the first extension 533 remains fixed resulting, therefore, in rotation of the second shaft 540 relative to the first shaft 530.

Broadly, the implement angle selection tool 594 is configured to selectively secure a first segment 595 of the first link 590 relative to a second segment 596 of the first link 590 to define a variable linear length of the first link 590. More particularly, the first link 590 is configured to have a plurality of linear lengths between the first shaft 530 and the second shaft 540, and the implement angle selection tool 594 is configured to select each of the plurality of linear lengths of the first link 590. A second pin 597 is inserted in aligned pin openings 599 of the first segment 595 and the second segment 596 to fix the length of the first link 590 and, therefore, fix the relative orientations of the first shaft 530 and the second shaft 540.

As mentioned above, in the current example the frame assembly 520 lacks a specific frame locking mechanism. Rather, the orientation of the first shaft 530 is fixed via the weight of the implement. To change the implement angle, the first pin 564 of the height adjustment tool 560 remains in place, and the second pin 597 of the angle selection tool 594 is removed from aligned pin openings 599 of the first segment 595 and the second segment 596 to decouple the first segment 595 and the second segment 596. In some examples, a user may manipulate the manually engageable mechanism 580 (e.g., a handle 588) to reduce forces on the second pin 597 prior to removal of the second pin 597.

When the first segment 595 and the second segment 596 are decoupled, the weight of the implement on the first shaft body 532 maintains a counterclockwise force (relative to FIG. 11) on the first shaft body 532, thereby maintaining pressure between the first pin 564 and the pathway extension 593 of the first segment 595. While the weight of the implement is also maintained on the second shaft body 542, that weight may be tempered by a spring 549 that partially counteracts the implement weight. As described above with reference to FIG. 3, the spring 549 can couple a third extension (not currently visible but can be consistent with component 148 in FIG. 3) of the second shaft body 542 to the vehicle frame 524.

A second manually engageable mechanism 582, which can be a lever 582 having a handle 588, is pivotably coupled to the second segment 596. After decoupling the first segment 595 and the second segment 596, a user can grasp the lever 582 to shift the second segment 596 relative to the first segment 595, which rotates the second shaft 540 relative to the first shaft 530. In examples consistent with the current embodiment, the second manually engageable mechanism 582 is configured as a lever having a fulcrum 586 fixed to the second segment 596. The first segment 595 and the second segment 596 are linearly translatable relative to each other along a linear translation pathway that is one or more slots 597 (only a small portion of which are visible, but similar slots are described above in previous examples) defined by the second segment 596.

The second manually engageable mechanism 582 is coupled to the first segment 595 at a fastener 584, where the fastener 584 is fixed to the first segment 595 and linearly translatable along a first slot 597 of the linear translation pathway (which in this example is a horizontal slot defined by the second segment 596). The fastener 584 is also linearly translatable along a second slot 581 defined by the manually engageable mechanism 582 (e.g., the lever). Stated differently, the lever 582 and the second segment 596 are translatable relative to the fastener 584. Such relative translation of the second segment 596 is accommodated by the first slot 597 of the second segment 596. The translation of the lever 592 relative to the fastener 584 is accommodated by the second slot 581 of the lever 582. Such a configuration leverages the weight of the implement exerted on the first segment 595 to assist in translating the second segment 596 along the linear translation pathway defined between the first segment 595 and the second segment 596. It will be appreciated that other lever configurations can also be used to adjust the implement angle.

When the desired implement angle is obtained, the second pin 597 is inserted into aligned pin openings 599 mutually defined by the first segment 595 and the second segment 596 to fix the length of the first link and, therefore, the implement angle.

In some embodiments, the second manually engageable mechanism 582 can be engageable with the foot of a user. In some other embodiments, a second manually engageable mechanism can be directly fixed to the second shaft body 542 and/or the second shaft 540. In such embodiments the second manually engageable mechanism can be pivoted by a user, resulting in pivoting the second shaft 540 relative to the first shaft 530 to adjust the implement angle.

It should also be noted that, as used in this specification and the appended claims, the phrase "configured" describes a system, apparatus, or other structure that is constructed or configured to perform a particular task or adopt a particular configuration. The word "configured" can be used interchangeably with similar words such as "arranged", "adapted," "constructed", "manufactured", and the like.

This application is intended to cover adaptations or variations of the present subject matter. It is to be understood that the above description is intended to be illustrative, and not restrictive, and the claims are not limited to the illustrative embodiments as set forth herein.

What is claimed is:

1. A grounds maintenance vehicle comprising:
a vehicle frame;
an implement coupled to the vehicle frame, the implement having a first implement end and a second implement end;
a height selection tool configured to select one vertical position of a plurality of selectable vertical positions, wherein each vertical position limits a distance between the implement and the vehicle frame;
a first link coupled to the first implement end and the second implement end, wherein the first link has an adjustable length; and
an implement angle selection tool having a manually engageable mechanism configured to change the elevation of one of the first implement end or the second implement end relative to the other of the first implement end or the second implement end by adjusting the length of the first link, and the implement angle selection tool is configured to fix the elevation of the first implement end relative the second implement end by fixing the length of the first link.

2. The grounds maintenance vehicle of claim 1, wherein the implement hangs from the vehicle frame via chains.

3. The grounds maintenance vehicle of claim 1, wherein the implement hangs from the vehicle frame via rigid linkages.

4. The grounds maintenance vehicle of claim 1, the implement comprising a plurality of cutting blades.

5. The grounds maintenance vehicle of claim 4, wherein the implement further comprises a cutting deck having a housing defining a cutting chamber wherein the plurality of cutting blades are disposed in the cutting chamber.

6. The grounds maintenance vehicle of claim 1, wherein the height selection tool comprises a first plurality of pin openings defined by the vehicle frame and a first pin configured to be received by each of the pin openings.

7. The grounds maintenance vehicle of claim 1, further comprising a first shaft pivotably coupled to the vehicle frame and coupled to the implement at the first implement end, wherein the manually engageable mechanism comprises a foot pedal fixed to the first shaft.

8. The grounds maintenance vehicle of claim 7, further comprising a second shaft pivotably coupled to the vehicle frame and coupled to the implement at the second implement end.

9. The grounds maintenance vehicle of claim 8, wherein the first link rigidly couples the first shaft and the second shaft.

10. The grounds maintenance vehicle of claim 9, wherein the implement angle selection tool comprises a second plurality of pin openings defined by the first link and a second pin configured to be received by each of the pin openings.

11. The grounds maintenance vehicle of claim 9, wherein the adjustable length of the first link is between the first shaft and the second shaft and the implement angle selection tool fixes the length.

12. A grounds maintenance vehicle comprising:
a vehicle frame having a first side and a second side;
a first shaft pivotably coupled to the vehicle frame extending from the first side to the second side;
a second shaft pivotably coupled to the vehicle frame extending from the first side to the second side;
an implement having a first implement end and a second implement end, wherein the first implement end is coupled to the first shaft and the second implement end is coupled to the second shaft;
a manually engageable mechanism configured to rotate the first shaft and the second shaft in unison;
a height selection tool configured to retain the first shaft and the second shaft in each of a plurality of discrete orientations against gravity to define a corresponding plurality of discrete limits on vertical distances between the implement and the vehicle frame; and
an implement angle selection tool configured to pivot one of the first shaft or the second shaft relative to the other of the first shaft or the second shaft and fix the orientation of the first shaft relative to the second shaft.

13. The grounds maintenance vehicle of claim 12, wherein the manually engageable mechanism is fixed to the first shaft and the manually engageable mechanism defines a stepping feature configured to be manually engaged by a foot of a user.

14. The grounds maintenance vehicle of claim 12, wherein the implement comprises a plurality of cutting blades.

15. The grounds maintenance vehicle of claim 12 wherein the implement comprises a cutting deck having a housing defining a cutting chamber and cutting blades disposed in the cutting chamber.

16. The grounds maintenance vehicle of claim 12, wherein the first shaft comprises a first shaft body and a first bell crank having a first extension extending radially outward from the first shaft body and the second shaft comprises a second shaft body and a second bell crank having a second extension extending radially outward from the second shaft body, and the grounds maintenance vehicle further comprises a first link coupling the first extension and the second extension.

17. The grounds maintenance vehicle of claim 16, wherein the first bell crank has a first arm extending radially outward from the first shaft body in a different radial direction from the first extension and the second bell crank has a second arm extending radially outward and in a different radial direction from the second extension, and the implement hangs from the first arm and second arm.

18. The grounds maintenance vehicle of claim 16, wherein the height selection tool comprises a plurality of pin openings defined by the vehicle frame and a pin receiving surface defined by the first link, and the height selection tool further comprises a first pin configured to be received by a pin opening in the vehicle frame and the pin receiving surface of the first link, wherein the first pin is configured to obstruct pivoting of the first shaft and the second shaft.

19. The grounds maintenance vehicle of claim 16, wherein the height selection tool defines a plurality of pin openings defined by the vehicle frame and the height selection tool comprises a first pin configured to be received by each of the plurality of pin openings, wherein the first pin obstructs translation of the first link when the first pin is positioned in each of the plurality of pin openings.

20. The grounds maintenance vehicle of claim 16, wherein the first link is configured to have a plurality of linear lengths between the first shaft and the second shaft, and the implement angle selection tool is configured to select each of the plurality of linear lengths of the first link.

21. The grounds maintenance vehicle of claim 20, wherein the first link comprises a first segment coupled to the first extension and a second segment coupled to the second extension, wherein the implement angle selection tool is configured to secure the first segment to the second segment to define each of the plurality of linear lengths of the first link.

22. The grounds maintenance vehicle of claim 21, wherein the first link defines a linear translation pathway between the first segment and the second segment, and the implement angle selection tool selectively secures the first segment relative to the second segment at a plurality of locations along the linear translation pathway.

23. A grounds maintenance vehicle comprising:
a vehicle frame having a first side and a second side;
a first shaft pivotably coupled to the vehicle frame extending from the first side to the second side, the first shaft comprising a first shaft body and a first bell crank towards the first side having a first extension extending radially outward from the first shaft body and a first arm extending radially outward from the first shaft body in a different radial direction from the first extension, and the first shaft further comprising a pivot crank towards the second side, the pivot crank extending radially outward from the first shaft body;
a second shaft pivotably coupled to the vehicle frame extending from the first side to the second side, the second shaft comprising a second shaft body and a second bell crank towards the first side having a second extension extending radially outward from the second shaft body and a second arm extending radially outward from the second shaft body, wherein the second arm extends radially outward in a different radial direction than the second extension, the second shaft further comprising a third arm towards the second side, the third arm extending radially outward from the second shaft body;

a first link comprising a first segment coupled to the first extension and a second segment coupled to the second extension, wherein the first link has an adjustable length between the first shaft and the second shaft;

an implement comprising a cutting deck having a housing defining a cutting chamber, cutting blades disposed in the cutting chamber, a first implement end, and a second implement end, wherein the first implement end is coupled to the first arm and the pivot crank and the second implement end is coupled to the second arm and the third arm;

a manually engageable mechanism fixed to the first shaft, the manually engageable mechanism comprising a lever having a stepping feature configured to be manually engaged by a foot of a user, wherein the lever is configured to pivot the first shaft and the second shaft in unison;

a height selection tool configured to define a corresponding plurality of discrete limits on vertical distances between the implement and the vehicle frame, wherein the height selection tool comprises: a plurality of pin openings defined by the vehicle frame, and a first pin configured to be received by a pin opening of the plurality of pin openings, wherein the first pin obstructs translation of the first link when the first pin is positioned in each of the first plurality of pin openings; and an implement angle selection tool configured to pivot one of the first shaft or the second shaft relative to the other of the first shaft or the second shaft and fix the orientation of the first shaft relative to the second shaft by selectively securing the first segment to the second segment to define a user-selected linear length of the first link.

* * * * *